US011740053B2

United States Patent
Hamilton

(10) Patent No.: US 11,740,053 B2
(45) Date of Patent: Aug. 29, 2023

(54) INTEGRATED OPTICAL SIGHTING SYSTEM FOR FIREARM

(71) Applicant: Sturm, Ruger & Company, Inc., Southport, CT (US)

(72) Inventor: Gary Hamilton, South Windsor, CT (US)

(73) Assignee: Sturm, Ruger & Company, Inc.

( * ) Notice: Subject to any disclaimer, the term of this patent is extended or adjusted under 35 U.S.C. 154(b) by 30 days.

(21) Appl. No.: 17/392,451

(22) Filed: Aug. 3, 2021

(65) Prior Publication Data
US 2022/0034629 A1    Feb. 3, 2022

Related U.S. Application Data

(60) Provisional application No. 63/060,210, filed on Aug. 3, 2020.

(51) Int. Cl.
*F41G 1/30*    (2006.01)
*G02B 23/10*   (2006.01)

(52) U.S. Cl.
CPC ............... *F41G 1/30* (2013.01); *G02B 23/10* (2013.01)

(58) Field of Classification Search
CPC .................................. F41G 1/30; G02B 23/10
USPC ......................................................... 42/113
See application file for complete search history.

(56) References Cited

U.S. PATENT DOCUMENTS

| 2,453,697 | A  | * | 11/1948 | Brown ................... F41G 1/345 |
|           |    |   |         | 89/41.19 |
| 6,860,056 | B2 |   | 3/2005  | Howe |
| 7,562,486 | B2 |   | 7/2009  | LoRocco |
| 7,743,546 | B2 |   | 6/2010  | Keng |
| 8,006,428 | B2 |   | 8/2011  | Moore |
| 8,087,196 | B2 |   | 1/2012  | Jung et al. |
| 8,099,897 | B2 |   | 1/2012  | Glen et al. |
| 8,230,637 | B2 |   | 7/2012  | Lamb |
| 8,448,373 | B2 |   | 5/2013  | Matthews et al. |
| 8,635,801 | B2 |   | 1/2014  | Glimpse et al. |
| 8,671,611 | B2 |   | 3/2014  | Ostergren et al. |
| 8,683,731 | B2 |   | 4/2014  | Kowalczyk et al. |
| 8,863,433 | B2 |   | 10/2014 | Kruse |
| 8,879,146 | B2 |   | 11/2014 | LoRocco |
| 8,925,237 | B2 |   | 1/2015  | Howe et al. |

(Continued)

FOREIGN PATENT DOCUMENTS

WO    WO2019/142056 A1    7/2019

*Primary Examiner* — Samir Abdosh
(74) *Attorney, Agent, or Firm* — The Belles Group, P.C.

(57) ABSTRACT

An illuminated reflex optical sighting system integrated directly into a firearm includes a lighting module comprising an illumination source mounted to a body of the firearm at a discrete first mounting location, an optical lens assembly mounted to the body of the firearm at a discrete second location spatially distanced from the first location, and a power source operably coupled to the illumination source. The illumination source is configured and operable to project a reticle onto a lens of the lens assembly for use in aiming the firearm. The illumination source and lens assembly are separately mounted to and independently removable from the body of the firearm thereby providing a low profile sighting system which substantially retains the aspects of the original firearm. The illumination source, power source, and lighting control circuitry may be housed inside the metal rear sight of the firearm in one embodiment.

24 Claims, 18 Drawing Sheets

(56) References Cited

U.S. PATENT DOCUMENTS

| | | | |
|---|---|---|---|
| 9,212,867 B2 | 12/2015 | Patterson et al. | |
| 9,316,461 B1 | 4/2016 | Gwillim, Jr. | |
| 9,360,278 B2 | 6/2016 | Mansfield | |
| 9,453,706 B1 | 9/2016 | Crispin | |
| 9,500,442 B2 | 11/2016 | Collin et al. | |
| 9,574,853 B2 | 2/2017 | Crispin | |
| 9,593,906 B1 | 3/2017 | Oz et al. | |
| 9,638,492 B2 | 5/2017 | Jones | |
| 9,958,234 B2 | 5/2018 | Campean | |
| 10,086,527 B2 | 10/2018 | Teetzel et al. | |
| 10,088,275 B1 | 10/2018 | Warren | |
| 10,180,306 B2 | 1/2019 | Ben Zion et al. | |
| 10,386,157 B2 | 8/2019 | Plummer | |
| 11,067,348 B1* | 7/2021 | Ribic | F41G 1/30 |
| 2011/0314721 A1* | 12/2011 | Lamb | F41G 1/10 |
| | | | 42/145 |
| 2014/0305022 A1* | 10/2014 | Chung | F41G 1/387 |
| | | | 42/113 |
| 2018/0372448 A1* | 12/2018 | Noskowicz | F41G 1/14 |
| 2019/0049217 A1* | 2/2019 | Costet | F41G 11/001 |
| 2019/0186870 A1* | 6/2019 | Barnett | G02B 7/24 |
| 2020/0103201 A1* | 4/2020 | Cabrera | F41G 1/033 |
| 2020/0272044 A1* | 8/2020 | Walker | F41G 11/003 |
| 2021/0116213 A1* | 4/2021 | York | F41G 1/30 |
| 2021/0215457 A1* | 7/2021 | White | F41G 1/30 |
| 2021/0270572 A1* | 9/2021 | Dawson, Jr. | F41G 11/001 |
| 2021/0318099 A1* | 10/2021 | Holly | F41G 11/002 |
| 2021/0325146 A1* | 10/2021 | Thomele | F41G 11/005 |
| 2022/0034629 A1* | 2/2022 | Hamilton | G02B 23/10 |
| 2022/0390206 A1* | 12/2022 | Hamilton | F41G 1/30 |

* cited by examiner

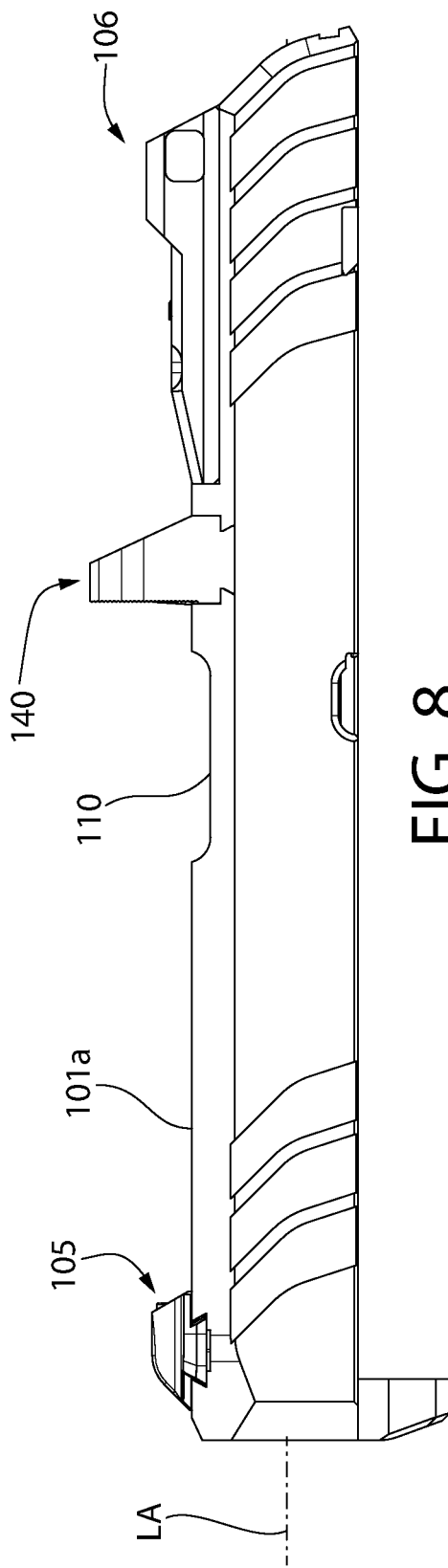
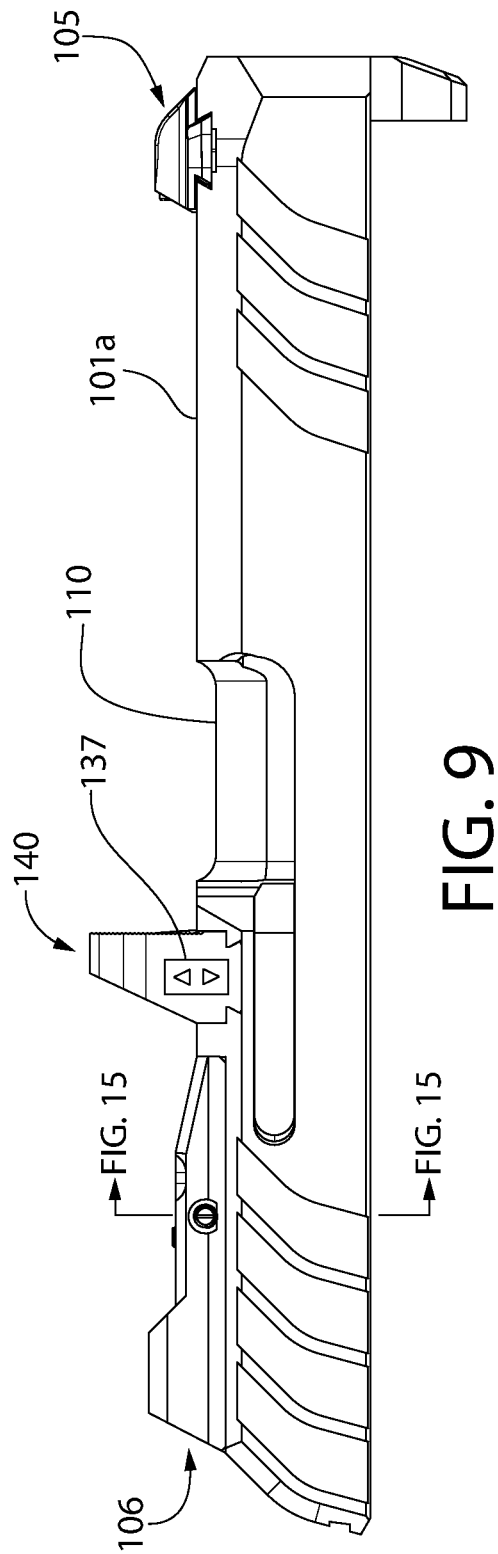

INTEGRATED OPTICAL SIGHTING SYSTEM FOR FIREARM

CROSS REFERENCE TO RELATED APPLICATIONS

The present application claims the benefit of priority to U.S. Provisional Patent Application No. 63/060,210 filed Aug. 3, 2020, which is incorporated herein by reference in its entirety.

BACKGROUND

The present invention generally relates to firearms, and more particularly to a reflex type optical sighting system for firearms.

A recent trend in the firearms industry is to attach an optical based illuminated sighting system to a wide variety of firearm platforms. These sights typically offer fast target acquisition, high contrast colored reticles (dots) and a parallax free sight picture. A red dot reflex optic is commonly used. Reflex optical sights are fairly simple mechanical designs which are distinguishable from the more complex and expensive holographic sights that do not have an optical lens element onto which a virtual dot reticle is projected by the light source. Holographic sights use a laser reflected from multiple mirrors to project a hologram rearwards to the user without the lens.

Reflex optical sights are offered as after-market fully self-contained "all-in-one" units which incorporate the light source, optical element such as the lens, power source, and electronics into a single common housing which must be mounted to the firearm via a specialized mounting interface. Such all-in-one optical sighting units may be relatively expensive, suffer from a large obtrusive profile objectionable to some users, and are not always easily adaptable to many different firearm platforms particularly those with limited available space. The common housing reflex sights also dramatically alter the original profile of the firearm.

Improvements in reflex type optical sighting systems for firearms are desired to provide a more economical and less obtrusive design.

SUMMARY

This disclosure provides illuminated optical sighting systems of the reflex type which are directly integrated into the original firearm platform as an OEM (original equipment manufacturer) device. The various components of the sighting system may be mounted directly to the body of the firearm at discrete and spatially separated mounting locations each having a unique mounting interface configuration. There are no separate intervening mounting or base plates required in some embodiments for the different optic components. The sub-system components are advantageously further not supported by or mounted in an obtrusive bulky single or common outer housing mounted to the firearm at a single location provided with a specialized mounting interface and which housing is separable from the firearm a single unit.

In one embodiment, an integrated optical sighting system according to the present disclosure may generally comprise discrete and separate components of a reflex type optical sight fixedly mounted and integrated directly into the body of the firearm at two or more discrete and spatially separated mounting locations. In one embodiment, a green or red dot reflex sight may be provided for high contrast; however, any other color such as yellow, etc. and/or shape of reticle may be provided.

A lighting module comprising an illumination or light source in one non-limiting embodiment may be mounted at a first discrete mounting location and spatially separated from a discrete optical lens assembly mounted forward of the light source at a second discrete mounting location. In various implementations, the lighting module may be integrated directly into the metal rear sight of the firearm in a cavity which conceals and houses the module. The illumination source, which may be a colored LED (light emitting diode), laser, or another suitable type source, projects a light beam in a forward light path/direction onto the lens of the lens assembly to produce the reticle. In other embodiments, the lighting module with illumination source may be mounted to the body of the firearm forward of the optical lens assembly. In such an arrangement, the light beam is projected in a rearward light path and direction onto the lens.

In some embodiments, the illumination source may also simultaneously illuminate a plastic or fiber light pipe or tube which may be integrated into the rear sight. Any suitable type or shape of light tube may be used (e.g. U-shaped or other).

A power source or supply onboard the body of the firearm may be used to power the illumination source. In one embodiment, the power source may be a replaceable or rechargeable battery of the disk type which is integrated into the firearm and wired to the light source. In some arrangements, the battery may be mounted directly into an available user-accessible space on the firearm at a third discrete mounting locations spatially separated from the discrete mounting locations of the lighting module/illumination source and/or lens assembly. This allows the power source to be spatially separated by a significant distance on the body of the firearm from the light source if needed depending on the design of the firearm body and available space. In other arrangements, the power source may be disposed adjacent the lighting module/illumination source and/or lens assembly such as within the metal rear sight of the firearm in one embodiment.

The optical lens assembly may be fixedly mounted to the firearm body in one embodiment. In another embodiment, however, a vertically slideable dot reflex type illuminated optical lens assembly may be provided which is integrated directly into the firearm body. The lens assembly in one non-limiting embodiment may be a spring-biased pop-up assembly linearly movable in a vertical direction from an inactive retracted position for storage and carry, and an active extended or projected position for use in sighting a target when discharging the firearm.

As previously noted, the foregoing optic components of the present integrated reflex optical sight discussed above are not mounted in a bulky common housing, and therefore do not suffer the drawbacks of large obtrusive profile all-in-one sight units previously described above in the Background. For example, in conventional all-in-one reflex type sighting systems, the entire sighting system with all of its sub-system components (e.g. lens, power source, light source, lighting control circuitry, etc.) must be packaged in a product housing or unit that can be mechanically attached to a firearm having a customized mounting interface for that particular housing. This packaged sighting unit therefore dictates the layout of each of the subsystems and thus the end product. Notably, such a conventional fully packaged unit may prevent its use on many firearms due to the firearm manufacturer's existing arrangement and size of the various components of the firearm itself. If the firearm is designed from the ground up to incorporate a specific conventional all-in-one sighting unit, the design and layout of the various firearm components and systems may be unduly restricted.

By incorporating or integrating an illuminated optical sighting system directly into the firearm (e.g. slide, receiver, stock, barrel assembly, etc.) in the manner disclosed herein, these subsystem components can be arranged in a way that better suits the individual weapons platform without imposing design constraints on the firearm. Such advantages that could be achieved include, but are not limited to, lower profile sight to barrel bore axis for improved shooting accuracy, integration with existing mechanical metal sights, providing an available onboard source of power which can be connected to and power other weapons accessories that may be used on the firearm (flashlights, lasers, range finders etc.), more compact sighting optical assembly, lower overall weight compared to bolt-on conventional pre-packaged all-in-one sighting units, modular removable/replaceable optical lens s assembly for less expensive replacement of the lens elements if broken, and others. Also, by integrating the sighting system components directly into the weapons platform at discrete mounting locations which are spatially separated, the optical lens assembly itself can be made more robust and tolerant of shock and vibration which can adversely affect the accuracy of the sight. In addition, in some embodiments, the illumination source could be modular such that the reticle (image) color and shape projected on the lens assembly could be changed by simply replacing the illumination source via a plug-and-play type interface.

The fixed and movable versions of the illuminated reflex optical sights according to the present disclosure may be directly integrated into any suitable fixed or movable portion or part of the firearm depending on the type of firearm. For example, the integrated optical sight may be incorporated into the reciprocating slide of a semi-automatic pistol in some embodiments, or the chassis/frame, receiver, grip, or other portion of the pistol or other type firearm.

The integrated sighting system is adapted for use with various types of firearms and weapons including handguns such as semi-automatic pistols or revolvers, long gun such as rifles or shotguns, grenade launchers, or other hand-held firearms and weapons. The sighting system is not limited in its applicability. Accordingly, the term "firearm" as used herein should be broadly construed to encompass at least all of the foregoing types of weapons.

According to one aspect, an illuminated reflex optical sighting system integrated directly into a firearm comprises: a lighting module comprising an illumination source mounted to a body of the firearm at a discrete first mounting location; an optical lens assembly mounted to the body of the firearm at a discrete second location spatially distanced from the first location; and a power source operably coupled to the illumination source; the illumination source configured and operable to project a reticle onto a lens of the lens assembly for use in aiming the firearm; wherein the illumination source and lens assembly are separately mounted to and independently removable from the body of the firearm. The first mounting location has a first interface configuration which is configured to mount the lighting module, and the second mounting location has a second interface configuration which is configured to mount the lens assembly, the first interface configuration being different than the second interface configuration. In one embodiment, the lighting module is integrated into a rear sight of the firearm having an aiming notch.

According to another aspect, a firearm with integrated illuminated reflex optical sight comprises: an elongated body comprising a first mounting location having a first interface configuration and a discrete second mounting location spatially separated from the first mounting location and having a second interface configuration different than the first interface configuration; a lighting module comprising an illumination source, the illumination module being mounted to the body of the firearm at the first mounting location, the lighting module being complementary configured to the first interface configuration; an optical lens assembly mounted to the body of the firearm at the second mounting location, the lens assembly being complementary configured to the second interface configuration which is different than the first interface configuration; and a power source operably coupled to the illumination source; the illumination source operable to project a reticle onto a lens of the lens assembly for use in aiming the firearm; wherein the illumination source and lens assembly are not disposed in a common outer housing removable from the body of the firearm as a single unit.

According to another aspect, a method for assembling a firearm with integrated reflex optical sighting system comprises: providing the firearm including a body; mounting an illumination source onto the body at a first discrete mounting location; in a separate step, mounting an optical lens assembly onto the body at a second discrete location spatially distanced from the first discrete location; and coupling a power source to the illumination source, the illumination source operable to project a reticle onto a lens of the lens assembly operable for aiming the firearm; wherein the lens assembly and illumination source are independently supported by the body of the firearm at the first and second discrete locations, respectively.

BRIEF DESCRIPTION OF THE DRAWINGS

The features of the exemplary ("example") embodiments will be described with reference to the drawings which include the figures provided herein.

FIG. 8 is a left side view thereof;

FIG. 9 is a right side view thereof;

Figure 1:
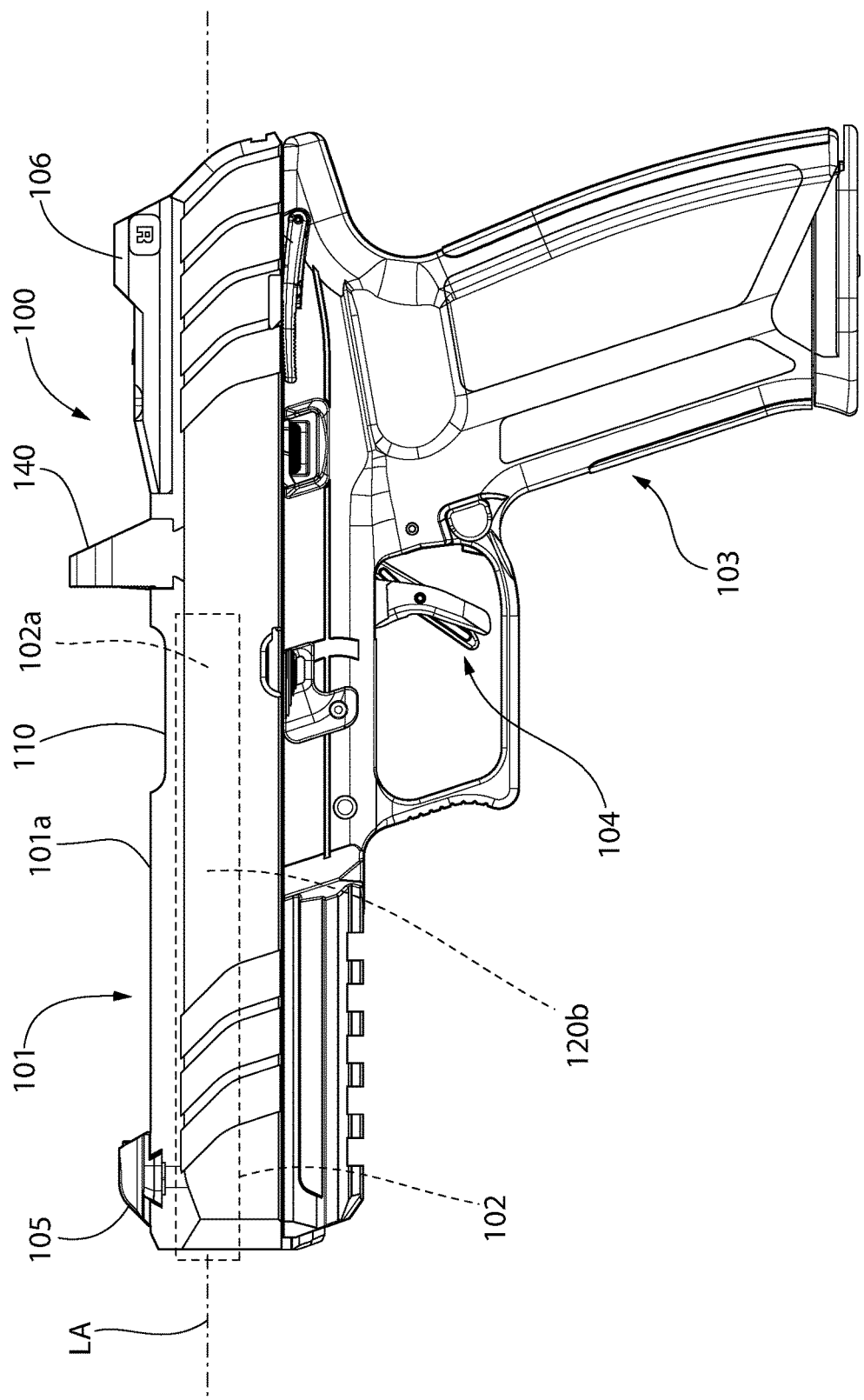
FIG. 1 is a left side view of a firearm in the form of a pistol comprising an reflex optical sighting system according to the present disclosure.

All drawings should be considered schematic and not necessarily to scale. Features numbered in some figures but appearing un-numbered in other figures are the same features unless noted otherwise herein.

DETAILED DESCRIPTION

The features and benefits of the invention are illustrated and described herein by reference to non-limiting exemplary ("example") embodiments. This description of exemplary embodiments is intended to be read in connection with the accompanying drawings or photos, which are to be considered part of the entire written description. Accordingly, the disclosure expressly should not be limited to such exemplary embodiments illustrating some possible non-limiting combination of features that may exist alone or in other combinations of features disclosed herein.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range.

Fixed Optical Lens Assembly

FIGS. 1-18 depict one non-limiting embodiment of an illuminated reflex optical sighting system comprising sighting system components directly integrated into the body 101 of the firearm 100. The firearm may be in the form of a semi-automatic pistol, as shown in the illustrated embodiment. In this embodiment, the portion of the firearm body 101 into which the sighting system are mounted is the movable slide 101a which defines the breech face 101b for forming a closed and open breech. Slide 101a reciprocates in a rearward and forward conventional known manner to cycle the action each time the pistol is fired.

As previously noted herein, however, the present reflex optical sighting system may be directly integrated into other types of handguns (e.g. revolvers or pistol with reciprocating bolt in lieu of slides), long guns (e.g. rifles or shotguns), or other type hand-held weapons using the same methodology disclosed herein. Accordingly, the invention and application of the present optical sighting system is not limited to pistols alone.

It bears noting that term "fixed" as used above only refers to the fact that the optical lens assembly 140 (further described below) of the sighting system is fixedly mounted to a portion of the body 101 of the firearm 100. Accordingly, the lens assembly in this embodiment is stationary relative to that portion to which it is affixed. That portion of the firearm body such as pistol slide 101a, however, may be moveable relative to other part of the firearm body (e.g. chassis/frame, barrel, etc.) during operation of the firearm as described above. Any other interpretation of the term "fixed" with respect to the lens assembly when construing this written description and claims should therefore be discounted.

With continuing reference to FIGS. 1-18, firearm 100 defines a longitudinal axis LA and generally includes body 101 and chassis or frame 103. Body 101 comprises the reciprocating slide 101a in the illustrated but non-limiting embodiment of the semi-automatic pistol. Slide 101a is axially elongated and defines a downwardly open longitudinal chamber 101c for housing some of the firing mechanism components and barrel of the firearm in a conventional manner.

Frame 103 may have any suitable shape and is configured for holding the firearm and supporting the slide 101a for reciprocating forward and rearward motions to open and close the breech in the conventional manner each time the firearm is fired and the action cycled. Spring-biased firing pin 107 and firing pin spring 107a are carried by slide 101a. The front end of the axially elongated firing pin is projectable through the breech face 101b of the slide in a known manner to strike a chambered ammunition cartridge for firing. The rear end of the firing pin is configured for striking via a spring-biased hammer (not shown) in one embodiment. In other embodiments, firing pin may be a striker which is directly cocked and released by the firing mechanism to discharge the firearm without use of an intervening hammer.

Slide 101a also supports a pivotably movable spring-biased ejector 110a located adjacent ejection port 110. The ejector is configured to extract a chambered spent ammunition cartridge shell or casing for ejection through ejection portion 110 each time the firearm is fired and the action is cycled.

The firearm 100 further includes axially elongated barrel 102 supported directly or indirectly in part by the slide 101a and frame 103. Barrel 102 (shown schematically in FIG. 1) is configured for chambering an ammunition cartridge and defines a cartridge chamber 102a at the rear breach end of the barrel configured for holding a cartridge, and an axial bore 102b extending forward therefrom towards the front muzzle end of the barrel which forms a projectile passageway for guiding the projectile toward the target. A trigger-actuated firing mechanism 104 supported by the frame 103 is configured and operable to release a striking member such as a spring-biased hammer or striker to detonate the cartridge for explosively releasing the projectile when discharging the firearm. Firearm 100 comprises a front end 100a and opposite rear end 100b along the longitudinal axis LA which coincides with and is defined by barrel bore 102b.

Firearm 100 further includes a metallic front sight 105 mounted adjacent to front end 100a of the firearm on slide 101a, and metallic rear sight 106 mounted adjacent to rear end 100b of the firearm on the slide. The metal front and rear sights 105, 106 may be considered "iron sights." The term "iron sight" is a commonly used term of art used to refer to firearm sights which are formed of any suitable type metal such as without limitation aluminum, steel, titanium, or others. The term therefore does not literally mean that the sights are necessarily formed of the metal "iron" per se, but rather are metallic in nature. Rear sight 106 may have a laterally broad and axially elongated body defining an axially oriented aiming notch 106a at top which can be aligned with the reticle and/or front sight 105 when aiming the firearm downrange to acquire the target. In some embodiments, the rear sight may be formed from a suitably strong polymer. The rear sight is discrete and separate structure from the optical reflex sight with lens assembly disclosed herein.

It bears noting that such metal rear sights may include provisions for lateral/horizontal and vertical adjustment via adjustment screws which may be separate from the adjustment screws 139a, 139b of the illumination source mechanical adjustment mechanism 160 further described herein which adjust the position of the illumination source 130/ lighting module 131 relative to the rear sight and body 101 (e.g., slide 101a) of the firearm.

The integrated illuminated reflex optical sight according to the present disclosure may be generally comprised of five main sub-system components including without limitation a power supply or source 120, light or illumination source 130, optical lens assembly 140 comprising a lens or lenses 141 having a reflective coating, lighting control circuit 150 which may be embodied in a printed circuit board (PCB), and a mechanical adjustment mechanism 160 operable to change the position of the light source relative to the lens assembly for adjusting the position of the reticle R thereon, as further described herein. The power supply or source 120 may be a replaceable battery cell such as a lithium battery in one embodiment which is carried onboard the firearm; however, rechargeable batteries such as lithium ion may also be used.

The illumination or light source 130 may be a light emitting diode (LED) in one embodiment which may typically be red or green for producing a corresponding colored high contrast reticle on the lens of the lens assembly. Although these colors may generally be favored by firearm users, other color LEDs may be used. It is further possible in some embodiments to use an LED that is multicolored and/or dimmable coupled to lighting control circuit 150 which is configured and operable to change color of the LED and/or intensity of light emitted. In some embodiments, a suitable laser may be used as the light source instead of an led.

Illumination source 130 may be mounted directly to the body 101 of firearm 101 (see, e.g. FIG. 22), or alternatively may be coupled to and supported by a lighting housing or module 131 which in turn is directly coupled and mounted to the firearm body (FIGS. 1-18). Module 131 may have any suitable shape and be configured to allow the user to adjust the lateral and vertical position of the illumination source relative to the lens assembly 140 and body 101 (e.g., slide 101a) of the firearm, as further described herein.

A commercially-available collimated/focused LED may be used which for illumination source 130. This creates a collimated beam of light L which follows a straight light path P and is focused on optical lens 141 to form the sight's reticle R thereon, which in turn is reflected or directed rearwards towards the user's eye (see, e.g. FIG. 13). The LED may have an associated aperture which can be a variety of shapes to aid in target acquisition and ranging depending on the desired shape of the reticle projected onto the optical lens (e.g. circular for dot reticles, cruciform for cross hairs, ring shaped, chevron shaped, triangular, etc.). In one non-limiting embodiment, the aperture may be circular to produce a dot-shaped reticle on the lens. Other shaped apertures may be used to produce other corresponding reticle shapes such as a crosshair or other. In some embodiments, a laser may be used to produce the beam of light and reticle on the lens.

In one embodiment as shown, the illumination source 130 may be located to the rear of and spatially separated from optical lens assembly by an expanse of the firearm body such that no mounting interface extends contiguously between the discrete mounting location L1 for the illumination source 130 and discrete mounting location L2 for the lens assembly 140 as shown. The firearm body 101 (e.g. slide 101a in one embodiment) is uniquely configured via fabrication and machining (e.g. molding, casting, milling etc.) at each of mounting locations L1 and L2 to match the unique configuration and mounting requirements of each of the illumination source 130 and lens assembly 140 which are different. Accordingly, mounting location L1 on the firearm body has a first interface configuration C1 which is different than a second interface configuration at mounting location L2. Interface configuration C1 is complementary configured to the illumination source 130 for accepting and coupling the illumination source to the firearm body 101. Similarly, interface configuration C2 is complementary configured to the lens assembly 140 for accepting and coupling the lens assembly to the firearm body 101.

Interface configuration C1 at mounting location L1 of firearm body 101 for illumination source 130 may include an open lighting cavity 111 which may be any of upwardly, forwardly, and/or rearwardly open to project the beam of light from the illumination sources onto lens 141 of the lens assembly. The configuration and outwardly open areas of the lighting cavity 111 will depend at least in part whether the illumination source is located forward or rearward of the lens assembly 140 on the firearm. Cavity 111 may be sized for mounting the illumination source 130 if used alone or the lighting module 131 if used for housing the illumination source. Cavity 111 may be formed in the body 101 of firearm 100 in some embodiments. In one preferred but non-limiting embodiment, cavity 111 may be formed inside the rear iron sight as further described herein.

Figure 4:
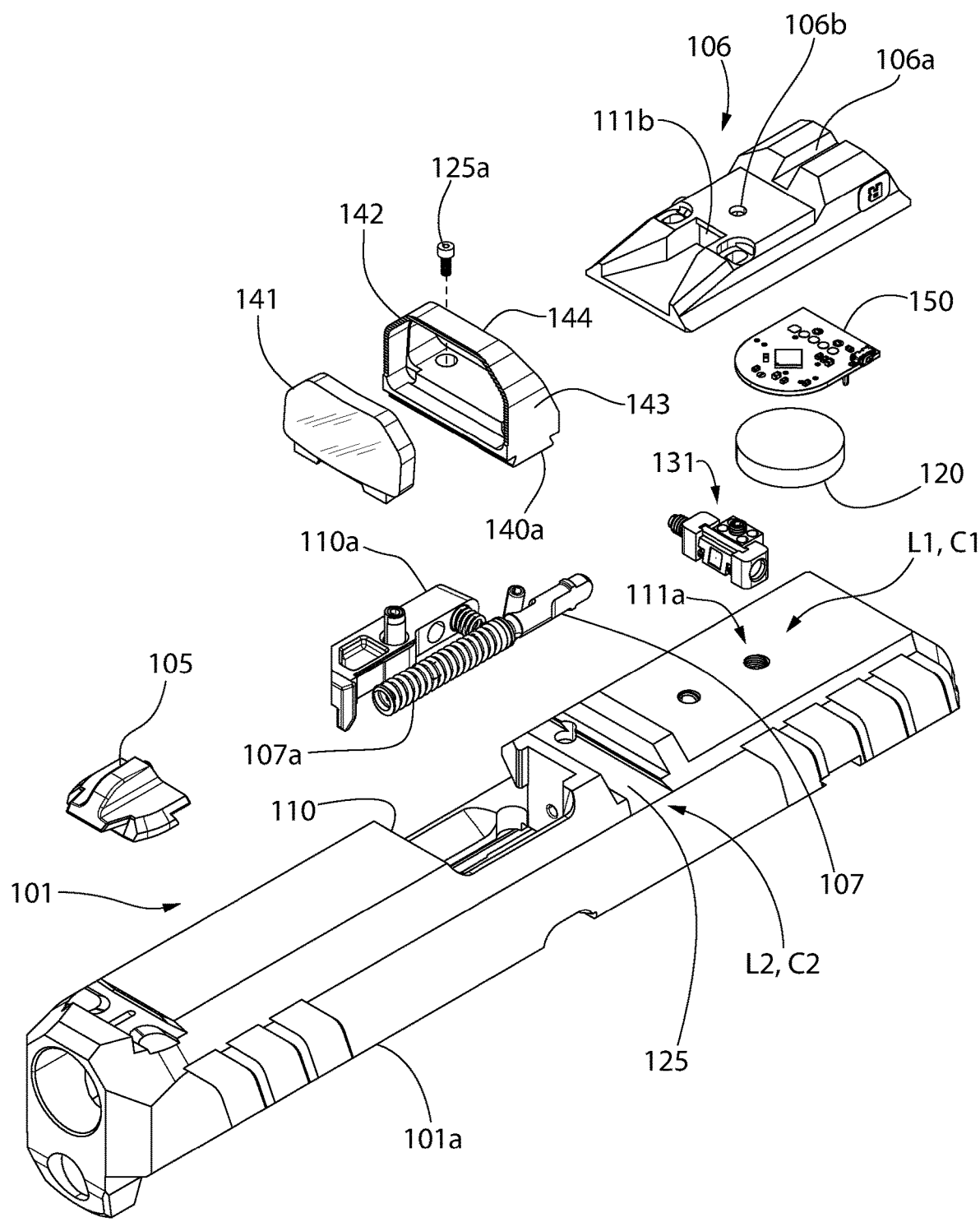
FIG. 4 is a top exploded perspective view thereof.
Figure 5:
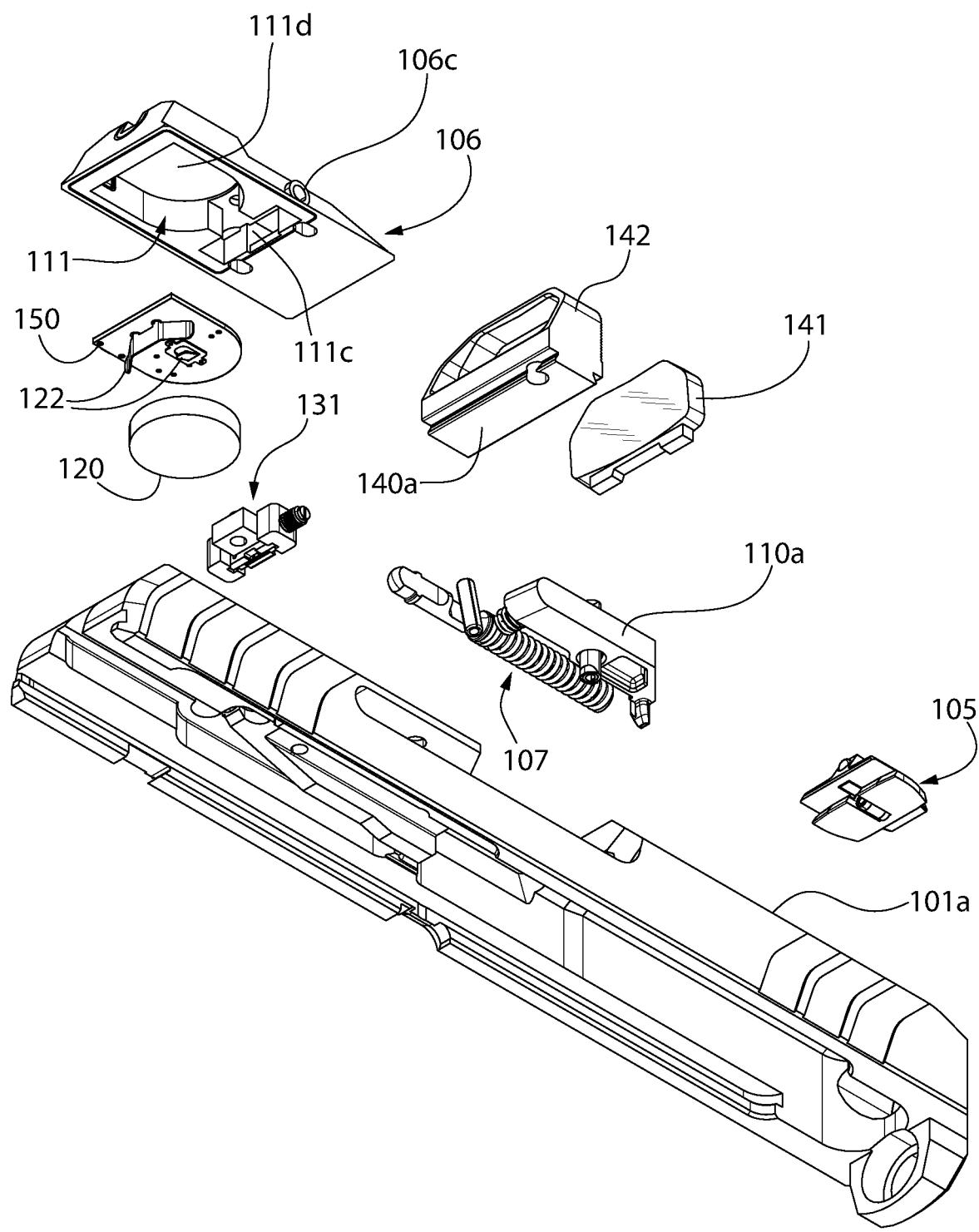
FIG. 5 is a bottom exploded perspective view thereof.
Figure 7:
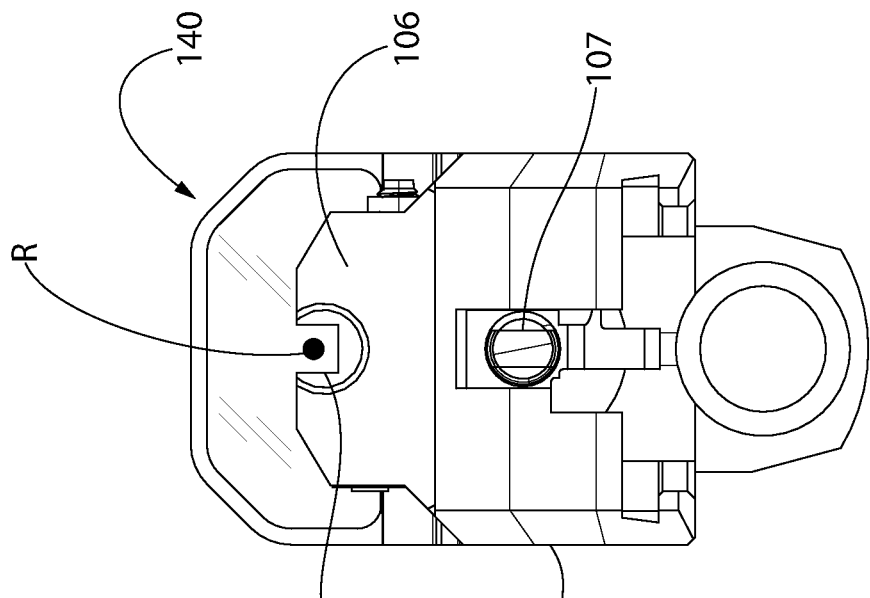
FIG. 7 is a rear view thereof.
Figure 6:
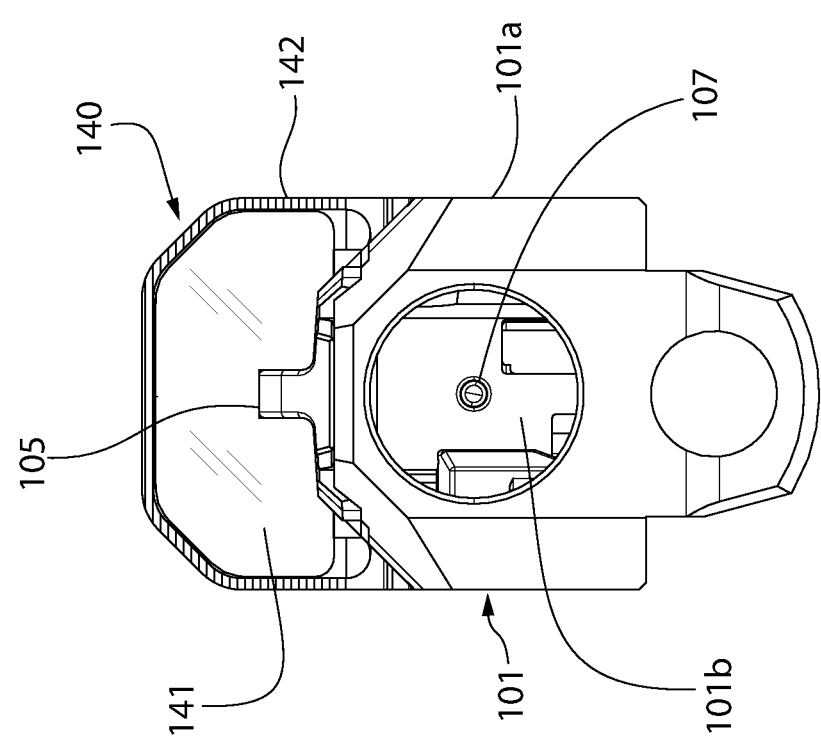
FIG. 6 is a front view thereof.
Figure 10:
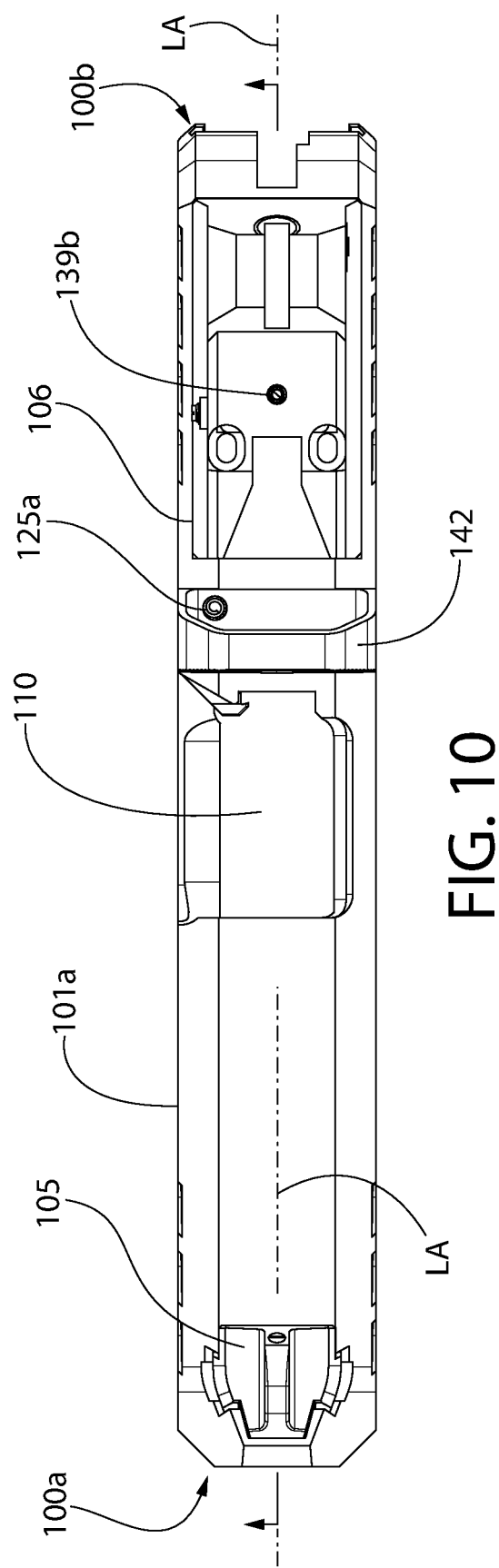
FIG. 10 is a top view thereof.
Figure 11:
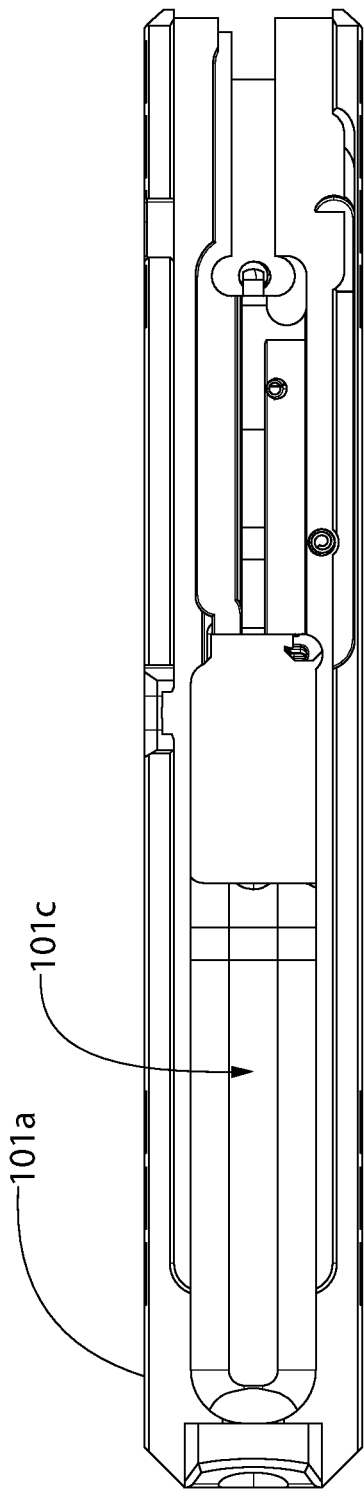
FIG. 11 is a bottom view thereof.
Figure 12:
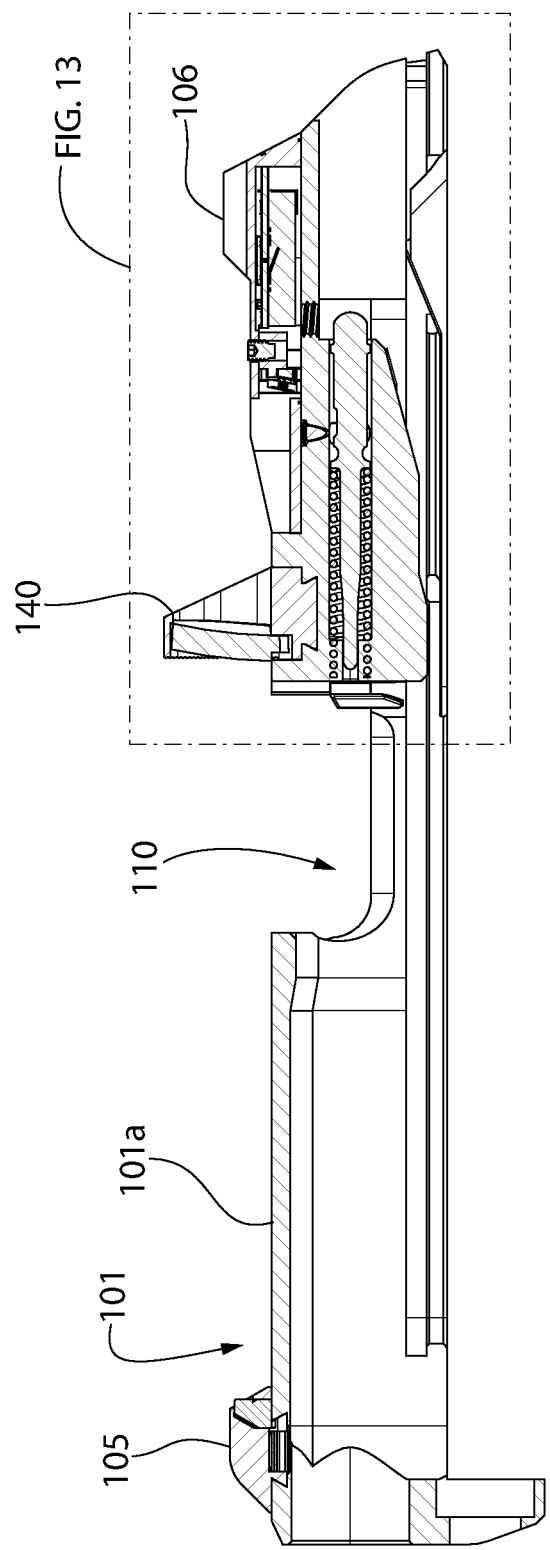
FIG. 12 is a left longitudinal cross-sectional view thereof.

Interface configuration C2 at mounting location L2 on firearm body 101 for lens assembly 140 may include a transversely extending mounting recess or slot 125 which accepts the bottom mounting portion 140a of the lens assembly peripheral frame 142 (see, e.g. FIGS. 4-5). Mounting portion 140a and slot 125 may have a complementary configured dovetail and dovetail slot interface arrangement in one embodiment as shown such that lens assembly 140 is laterally and slideably inserted into slot 125. Lens assembly 140 may be fixed in position on slide 101a via a threaded fastener 125a in one embodiment. Other interface configurations however may be used. It bears noting that uniquely shaped and different interface configurations C1 and C2 are distinguishable from the single mounting interface configuration of all-in-one optical unit housings in which the sighting system components share a common housing which is mounted to the firearm.

The beam of light L projected in a forward direction in light path P from the illumination source 130 strikes the rearwardly concave lens 141 of lens assembly 140 to form the resultant reticle R (image). The reticle image is reflected back towards the user's eye at the rear of the firearm through rear sight 106 (see, e.g. FIG. 13). In other embodiments (see, e.g. FIG. 25), the illumination source 130 may alternatively be located in front of the optical lens assembly such that the light beam is projected rearward in a light path or direction onto lens 141 to form the reticle, which is directed rearwards towards the user's eye.

The lens 141 of optical lens assembly 140 accordingly is where the reticle image appears and what the user views and uses to identify the sight picture or target down range. The lens assembly 140 generally comprises a peripheral frame 142 which defines mounting portion 140a of the lens assembly mounted directly to the body 101 of the firearm 101 at mounting location L2, and the lens 141 supported at its peripheral edges by the frame. Any shape peripheral frame may be used and generally includes a pair of laterally spaced vertical side members 143 and horizontal member 144 spanning between the side members.

Lens 141 may be formed of transparent glass or polymer operable to shine or reflect the light beam emitted by light source 130 back towards the user's eyes for sighting the target. A reflective coating on the lens allows the wavelength of light from the illumination source 130 to bounce back towards the users eyes. This creates the virtual image or reticle R on the lens from the light source that visually appears to be in front of the firearm as the user looks through the lens to acquire the target. It is through this reflection that parallax is reduced compared to fixed sight (e.g. iron sight) systems which adversely affects point of aim. The illumination source 130 is placed in a preselected precise orientation in relation to the lens assembly 140 and the user's eye. It is possible to have this illumination source above, below, left, right, in front, or behind (or any combination of those) in relation to the optical lens assembly. The lens shape/curvature and structure dictates the position of the illumination source in relation to the user's eye to create the desired reticle and sight picture. The "virtual" reticle (image) appearing on the lens 141 appears to be down range to the user and is indicative of the expected projectile trajectory towards a target.

The peripheral frame 142 of lens assembly 140 may be comprised of a metal, polymer, or combination thereof configured for mounting directly to the body 101 of a 100 (e.g. slide 101a). Any suitable coupling means such as threaded fasteners may be used to attached the frame to the firearm body. The peripheral frame 142 may be attached directly to the slide 101a as shown via the dovetail without any intervening mounting structures or plates necessary.

The lens 141 may also have an additional second coating that reflects a high percentage of a wavelength of light that corresponds to the wavelength output of the illumination source. This is typically on the optical surface of the lens that is opposite of the illumination source to create a reflection towards to users eye. With a multi-lens optical assembly, this surface could be internal to the lens assembly. This additional second coating reflects a high portion of the light (e.g. red in some embodiments) created by the illumination source 130 while allowing other wavelengths of light to pass through. This makes the lens appear transparent but is partially reflective to specific colors (i.e. wavelengths of light).

The lighting control circuit 150 is an electronic circuit formed on a printed circuit board (PCB) that is configured and operable via various electrically interconnected electronic devices thereon to permit the user to adjust features of the illumination source. This can include the brightness of the light source and resultant light beam which creates the reticle R on the lens, as well as the on/off function for the reflex sight to conserve battery power when not in use. Users can set preferred illumination levels for their environment based on prevailing conditions such as time of day, weather, canopy cover, interiors of buildings, etc. The control circuit is operably coupled or linked to the illumination source 130 and power supply/source 120 such as via wiring. In one embodiment, the illumination source may be mounted directly on the printed circuit board (PCB) of the lighting control circuit 150. In other embodiments as exemplified in the embodiment of FIGS. 1-18, the illumination source 130 is mounted to lighting module 131 as further described herein.

Lighting control circuit 150 is further operably coupled or linked to a lighting level control switch 137 which may be an electromechanical button or knob accessible to the user for adjusting the brightness of the reticle. Switch 137 may be located on the peripheral frame 142 of lens assembly 140 or on any other convenient accessible portion of the firearm body 101 (e.g. slide 101, chassis/frame 103, metal rear sight 106, etc.).

The lighting control circuit 150 in some embodiments may also include a wireless module to allow interaction between the user's personal electronic device (e.g. cellphone, tablet, laptop, etc.) and the weapon's optical sight using any suitable available wireless protocols. This could allow the user to set brightness, change illumination colors (in the case of a multicolor LED light source), reticle shape, reticle position, provide low battery warnings, and control of other integrated electronic accessories on the firearm via appropriately configured software (an application or "app") running on the user's personal electronic device.

The illumination source positional adjustment mechanism 160 associated with the lighting module 131 (containing the illumination source 130 of the reflex optical sighting system) may be integrated with the module design and comprises a mechanical mechanism in one embodiment. FIGS. 4-5 and 13-18 depict aspects of the adjustment mechanism. The mechanism is configured to move the lighting module 130/illumination source 130 laterally left or right, and vertically up or down relative to the slide 101a and optical lens assembly 140. This allows the user to adjust the sight for an offset of the actual point of impact on a target versus the viewable point of aim by movably adjusting the reticle R projected on lens 141 laterally and/or vertically. Adjustment mechanism 160 therefore is configured and operable to enable the user to readily adjust the position of the sighting reticle R on lens 141 for different projectile trajectories and ranges. By contrast, the lighting module 131/illumination source 130 may be preferably fixed in the axial direction of the longitudinal axis LA of the firearm so that the reticle focal point will remain constant and focused on the lens.

Referring to FIGS. 4-5 and 13-18, lighting module 131 with integrated illumination source adjustment mechanism 160 in one possible embodiment may comprise a rear mounting block 133, pair of right and left lateral support blocks 132a, 132b, adjustably movable illumination source mounting plate 134, illumination source frame 135, and front closure plate 136. Mounting plate 134 is vertically oriented and sandwiched/trapped between rear mounting block 133 and front closure plate 136 which may be detachably coupled together via thread fasteners 136b as shown in in one embodiment. Illumination source 130 is mounted to frame 135, which in turn is mounted to mounting plate 134 thereby securing the source 130 to the mounting plate between the front closure plate 136 and rear mounting block 133. Mounting plate 136 comprises a frontal opening 136a covered by a protective transparent window sheet 138. A line of sight is formed through opening 136a for the beam of light L emitted by illumination source 130 to project the reticle R onto lens 141 of lens assembly 140.

Mounting plate 134 is slideably mounted at each of its sides to a vertical slot 132c formed in each of the right and left lateral support blocks 132a, 132b for upwards/downwards vertical movement and adjustment of the illumination source 130. Rear mounting block 133 is vertically movable relative to slide 101a of firearm 100 at mounting location L1. Illumination source vertical mounting plate 134 is detachably coupled to rear mounting block 133 such as via a forward extending coupling protrusion 133a. Plate 134 has a rearwardly open recess 133b configured to receive protrusion 133a to form the coupling (see, e.g. FIG. 14). A vertical adjustment screw 139b threadably engaged with the rear mounting block at top allows the user to adjust the vertical position of the mounting 134 and concomitantly in turn illumination source 130 relative to the firearm to change the vertical position of the reticle on the lens assembly 140 by rotating the adjustment screw 139b in opposing directions. Adjustment spring 133b inside cavity 111 of metal rear sight 106 acts on the bottom of rear mounting block 133 to bias the block upwards towards vertical adjustment screw 139b.

In operation, rotating screw 139b in one direction moves rear mounting block 133 and illumination source mounting plate 134 (which supports illumination source 130) vertically downwards, thereby compressing spring 133b. Rotating screw 139b in the opposite direction causes spring 133b to expand and move rear mounting block 133 and mounting plate 134 vertically upwards under the biasing action of the spring. This permits the position of reticle R produced on lens 141 to be adjusted up or down.

Figure 15:
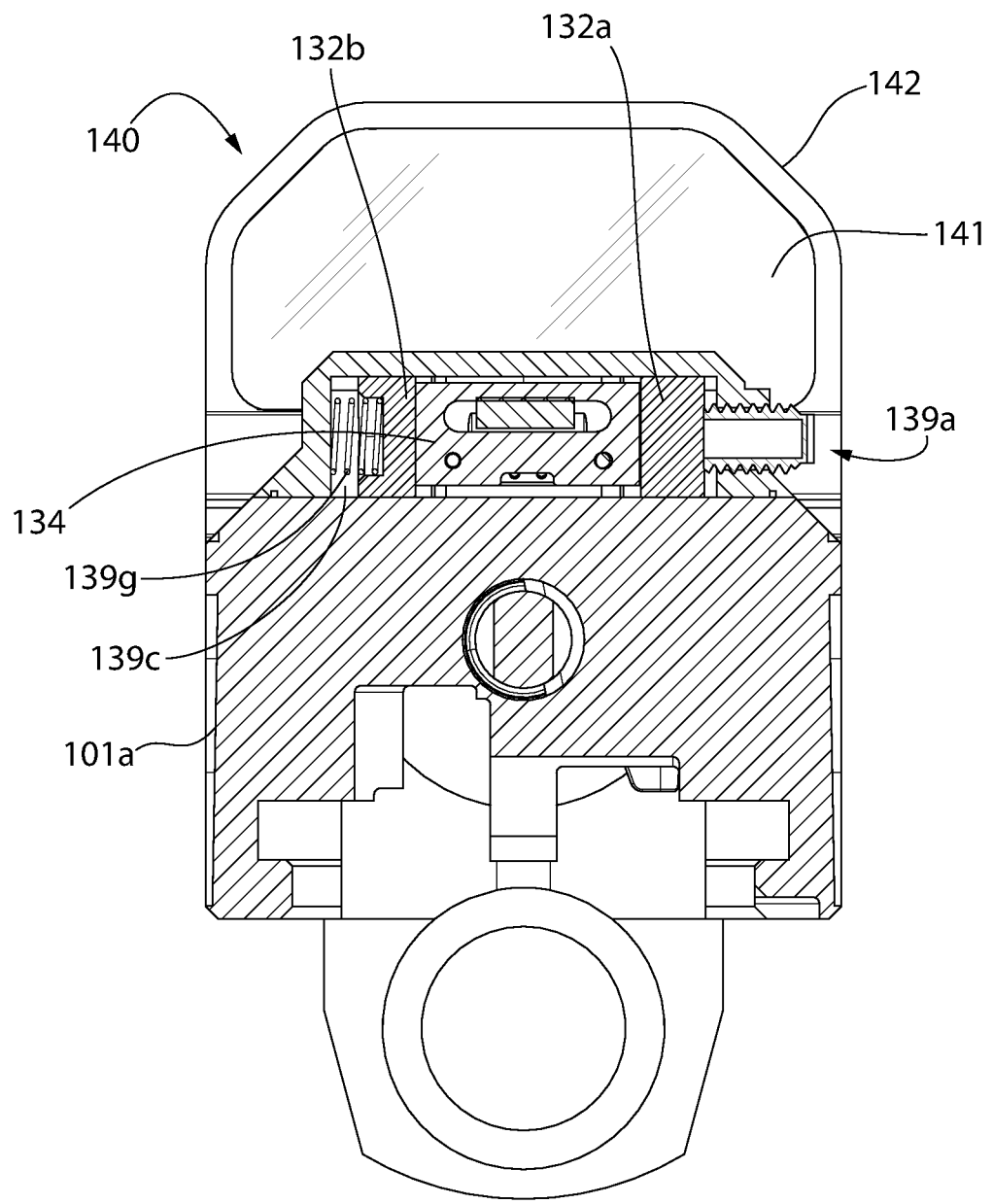
FIG. 15 is a transverse cross sectional view taken through the metallic rear sight on the slide showing components of the sighting system.
Figure 16:
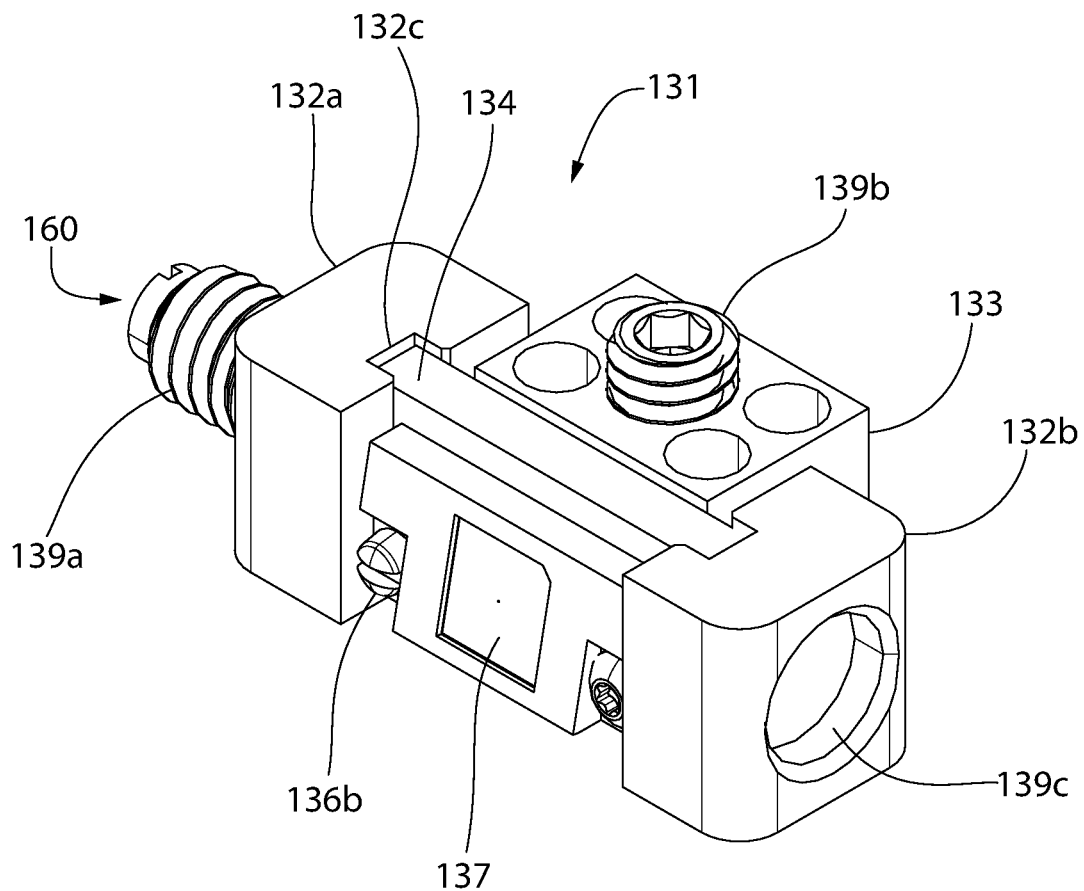
FIG. 16 is a front perspective view of the lighting module with illumination source therein of the present reflex optical sighting system.
Figure 17:
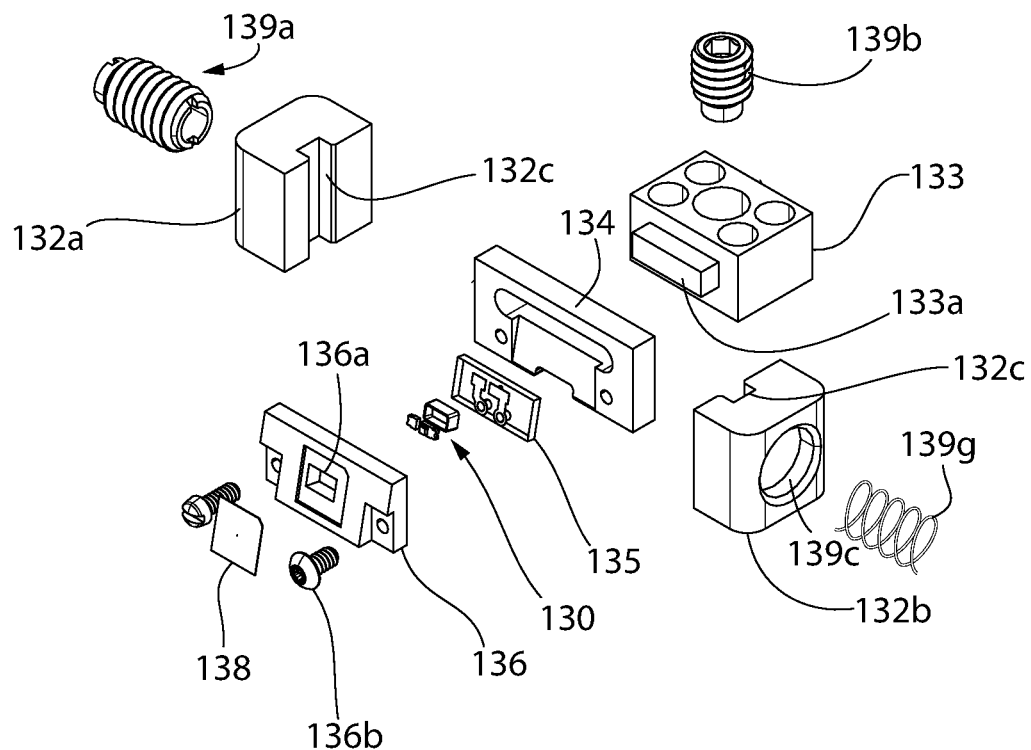
FIG. 17 is a top exploded perspective view thereof.
Figure 18:
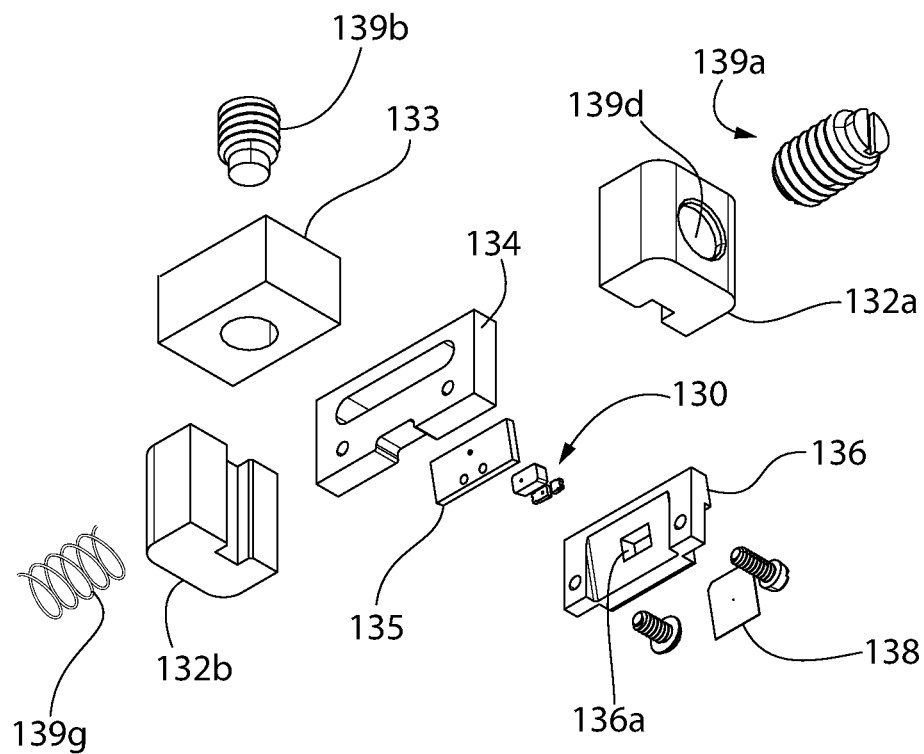
FIG. 18 is a bottom exploded perspective view thereof.

The right and left lateral support blocks 132a, 132b while fixed in vertical position when trapped inside metal rear sight 106 in cavity 111, are each laterally slideably mounted to slide 101a at mounting location L1 to permit right-to-left lateral/horizontal adjustment of the lighting module 131 and illumination source 130 therein relative to slide 101a. FIG. 15 is a transverse cross sectional view showing this arrangement. A transversely oriented lateral adjustment screw 139a threadably engaged with the right or alternatively left lateral support blocks 132a, 132b allows the user to adjust the transverse or lateral position of the lighting module 131 (and illumination source 130) relative to the firearm to change the vertical position of the reticle on the lens assembly 140 by rotating the adjustment screw 139a in either direction. The inner end of screw 139a may partially engage outwardly open socket 139d of right lateral support block 132a (see also FIGS. 17-18). Left lateral support block 132b contains outwardly open socket 139c which engages one end of an adjustment spring 139g. The opposite end of spring 139g is braced against an interior surface of metal rear sight 106. This biases the lateral support blocks 132a, 132b and vertical illumination source mounting plate 134 toward s the right lateral side of slide 101a towards lateral adjustment screw 139a.

In operation, rotating screw 139a in one direction moves mounting plate 134 (which supports illumination source 130) to the left, thereby compressing spring 139g. Rotating screw 139a in the opposite direction causes spring 139g to expand and move mounting plate 134 towards the right under the biasing action of the spring. This permits the position of reticle R produced on lens 141 to be adjusted laterally left or right.

In one embodiment of firearm 100 comprised of a semiautomatic pistol having an integrated illuminated optical sighting system as shown in the figures, the sighting system components are integrated directly into the reciprocating slide 101a which is carried by the firearm frame 103. The power source 120 may be incorporated into the slide forward of the lens assembly 140 by creating a pocket 121 therein for housing the battery and electronics (e.g. control circuit) to reside. An external removable cover can provide access to and protection for the power source and associated electronics in some embodiments. In one embodiment, the battery may be disposed in a complementary configured pocket 121 of slide 101a, which may be accessible from the underside of the slide 101a after removal from the firearm for added protection against weather and wetness.

Figure 19:
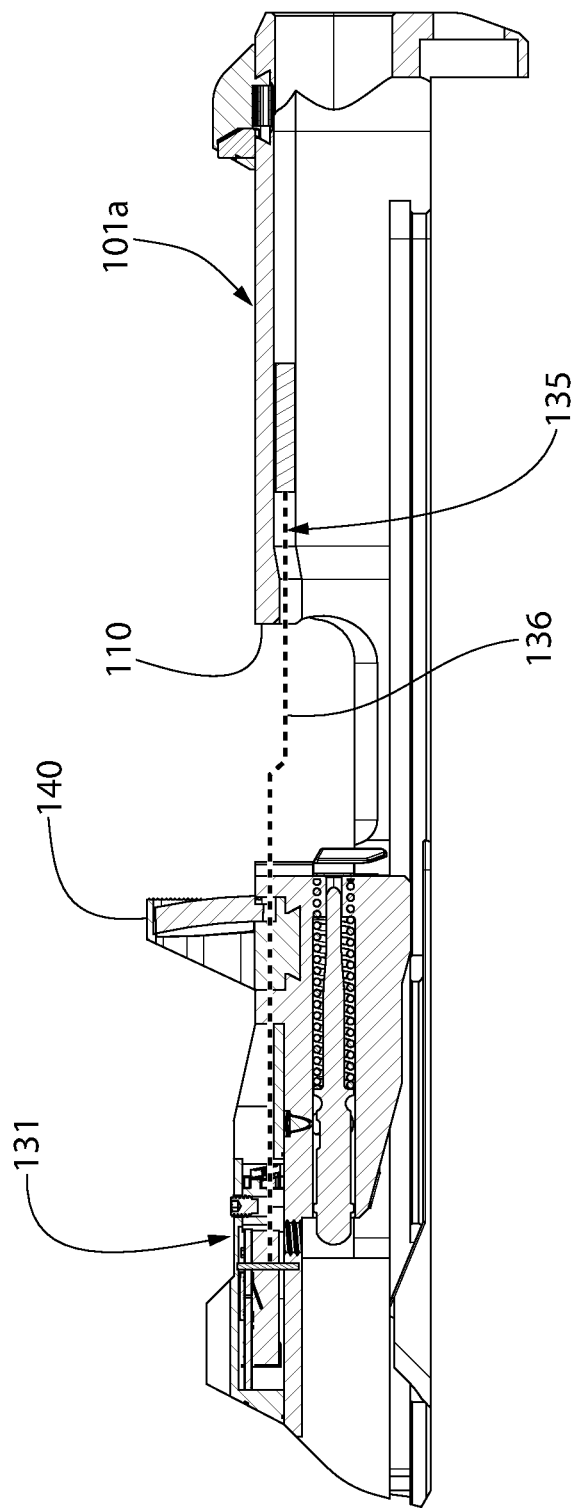
FIG. 19 is a longitudinal cross sectional view of the firearm slide showing power source and internal wiring connections.

A longitudinally-extending wiring channel 135 of suitable configuration may be provided internal to the slide 101a for routing the control and electric wiring 136 between the electronic lighting control circuit 150 and power source 120. Channel 135 may have any configuration or path for routing the wiring through the body of the slide. The channel 135 may be used when the control circuit board and power source are separated by a distance on the firearm 100 (see, e.g. FIG. 19). This allows the power source 120 to be, for example, mounted in front of the cartridge ejection port 110 and lens assembly 140 if needed to take advantage of available space on the forward portion of the slide 101a. The wiring 136 provides both power and control signals to the illumination source 130 and optionally the optical lens assembly 140 such as for the reticle brightness control switch 137 which may be mounted directly on the peripheral frame 142 of the lens assembly, as previously described herein. The brightness control switch on the lens assembly is thus operably coupled to the control circuit 150, which in turn is operably coupled to the illumination source 130 via wiring 136 to adjust the intensity level of the source, thereby allowing the user to adjust the brightness of the reticle (image) produced on the lens assembly.

In some possible embodiments, the illumination source 130 and power supply or source 120 could be concurrently located (i.e. same location) on the firearm body and the wired connection described above (e.g. control and power wiring 136) could be formed instead and reside on the same lighting control circuit 150 PCB (printed circuit board). Accordingly, the illumination source and power supply may be located on the lighting control circuit PCB, or at least at the same physical location such as discrete mounting location L1.

In one embodiment with general initial reference to FIGS. 1-18, the lighting control circuit 150 PCB, adjustable lighting module 131 containing illumination source 130, and power source 120 (e.g., battery) may be mounted to the firearm body 101 (e.g. slide 101a in one implementation) at the same discrete mounting location L1 separate from mounting location L2 of the lens assembly 140. These three components may be disposed and nested inside the metal rear sight 106 in one preferred but non-limiting embodiment. The rear sight protects these sensitive components from physical damage during normal handling of the firearm. An upward facing flat mounting surface 111a at discrete mounting location L1 may be used for mounting the lighting control circuit 150 PCB, lighting module 131, power source 120, and rear sight at the common mounting location L1. The illumination source 130 may be an LED as previously described herein, or a laser in other embodiments that may be mounted to the adjustably movable lighting module 131 which is supported by the surface 111a of the slide.

Referring to FIGS. 4-5 and 13-18, the metal rear sight 106 in one embodiment defines define the lighting cavity 111 which may be downwardly open. Rear portion 111d of cavity 111 in this embodiment may be complementary configured to the lighting control circuit 150 PCB as shown. When the optical sighting system components are fully assembled and inserted into cavity 111 in rear sight 106, the power source 120 may be mounted below the lighting control circuit 150 PCB in one embodiment. In other embodiments, their positions may be reversed.

Figure 13:
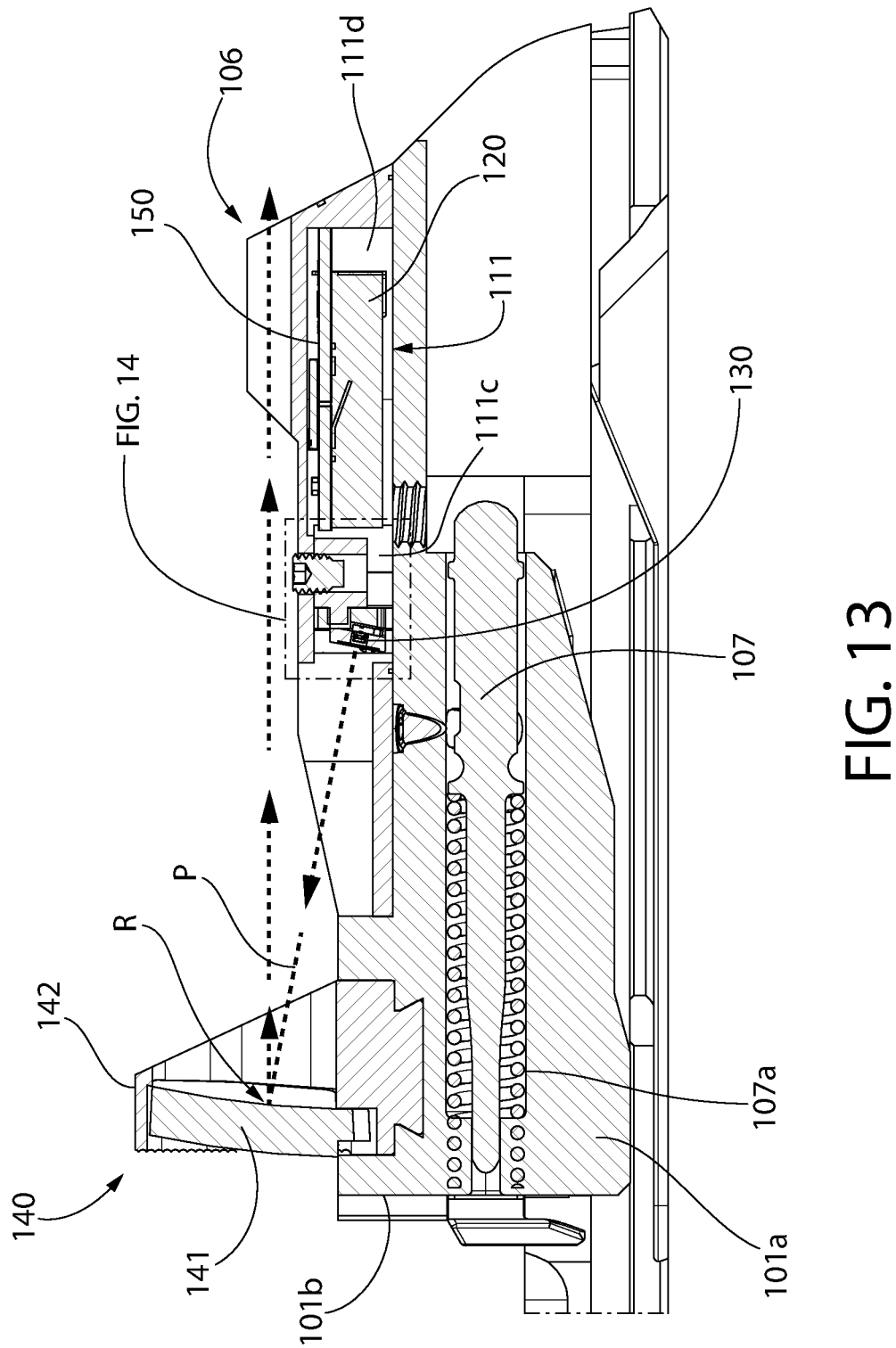
FIG. 13 is an enlarged detail taken from FIG. 12.
Figure 14:
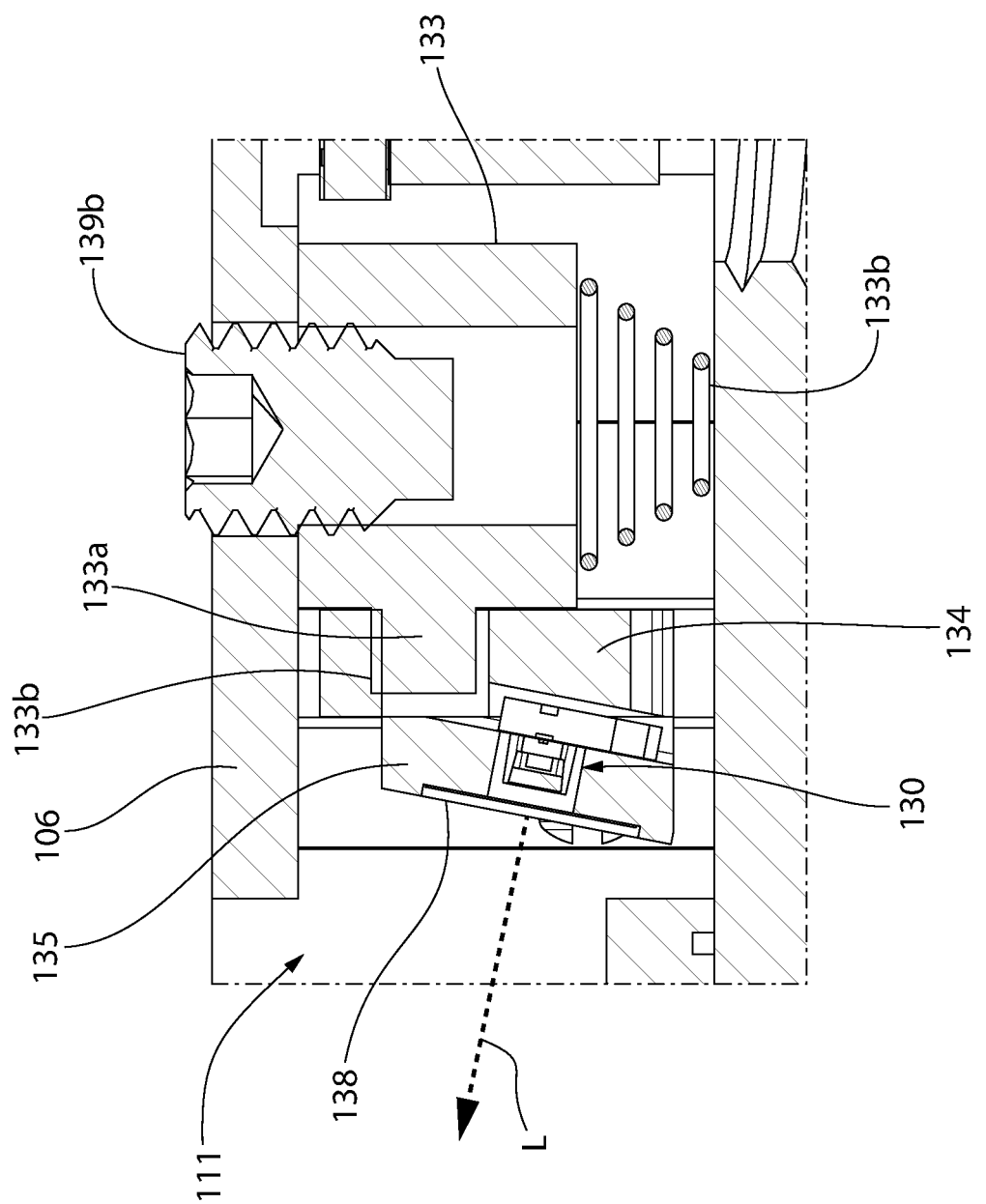
FIG. 14 is an enlarged detail taken from FIG. 13.

The illumination source 130 is arranged to project the emitted beam of light P in the forward axial direction and path P to form the reticle on lens 141 of lens assembly 140 (see, e.g. FIG. 13). To achieve this functionality, the rear sight 106 includes forward open window 111b which communicates with the open lighting cavity 111 formed inside the rear sight as previously described herein. The beam of light is therefore projected outwards from the rear sight onto the lens assembly.

Metal ("iron") rear sight 106 further includes at least one lateral access opening 106c to allow the user to access and rotate lateral adjustment screw 139a for adjusting the lateral (i.e. right-to-left) position of the reticle on lens 141 of lens assembly 140. Sight 106 further includes vertical access opening 106b to allow the user to access and rotate vertical adjustment screw 139b for adjusting the vertical position of the reticle on lens 141 of lens assembly 140. Each of the adjustment screws 139a, 139b may be projected outwards through or retracted inwards into their respective access openings 106c, 106b. In some embodiments, access openings 106c, 106b may be threaded to threadably engage the adjustment screws.

To assemble the illumination system and power source into the metal rear sight 106, the sight is turned upside down to access lighting cavity 111 from the underside of the sight. Lighting module 131 with illumination source 130 is inserted into a rectilinear front portion 111c of lighting cavity 111 in the sight. Front portion 111c is complementary configured to the rectangular cuboid body of the lighting module 131. The lighting control circuit 150 PCB is inserted into the complementary configured rear portion 111d of cavity 111 from the underside of the sight to occupy an upper position in the cavity and sight 106. The power source 120, which may be in the form of a circular disk type lithium ion battery as shown, is inserted into cavity rear portion 111d to engage metallic electrical contacts 122 formed on lighting control circuit 150 PCB, which in turn is electrically coupled to illumination source 131 such as via wiring. Rear sight 106 while optionally still inverted may then be placed onto and removably coupled to mounting surface 111a of slide 101a at discrete mounting location L1 on the body of the firearm (e.g. slide 101a in the present example) by any suitable means (e.g., fasteners, etc.). The foregoing components may be inserted into rear sight 106 in any order except for the battery.

Because the foregoing illumination system related components (lighting module 131 containing illumination source 130 and lighting control circuit 150 PCB) and power source 120 are concealed beneath the rear iron sight 106, the firearm advantageously maintains a standard original configuration with metallic rear and front sights except for the presence of the compact and slender lens assembly 140. Without the bulk created by larger prior all-in-one separate reflex type optical sighting system common housings in which all sighting system components are located, the more streamlined (Original) profile of the firearm can advantageously be maintained.

In yet other possible implementations of the present optical sighting system, the illumination source 130/lighting module 131 and lighting control circuit 150 PCB may be mounted in lighting module 131 while power source 120 (e.g. battery) is located at a separate discrete mounting location L3 spatially separated therefrom. In yet another implementation, the illumination source 130/lighting module 131 may be mounted to the firearm at one discrete mounting location while power source 120 is mounted to lighting control circuit 150 PCB at a distanced separate discrete mounting location. Or alternatively, each of the lighting control circuit 150 PCB, illumination source 130/light module 131, and power source 120 may be mounted to firearm 100 at three separate and distanced discrete mounting locations. Accordingly, it will be evident to those skilled in the art that the present directly integrated reflex optical sighting system advantageously has considerable flexibility in being adapted for use in numerous designs of handguns and long guns. This starkly contrasts to all-in-one optic housings in which all components of the illuminated sighting system are mounted at a single location on the firearm which restrictive.

For some semi-automatic pistols or long guns with a fixed barrel-receiver assembly which remains stationary on the frame when fired and have a reciprocating bolt, the previously described optical sighting system components could be attached directly to the fixed portion of the barrel-receiver assembly.

In some possible embodiments contemplated, the lens assembly may be a flip-up type lens mounted to the firearm body and pivotably movable via pinned connections between folded flat and unfolded vertical positions.

Any suitable metallic and/or non-metallic materials alone or in combination may be used for any of the integrated optical sighting system components described herein.

Figure 2:
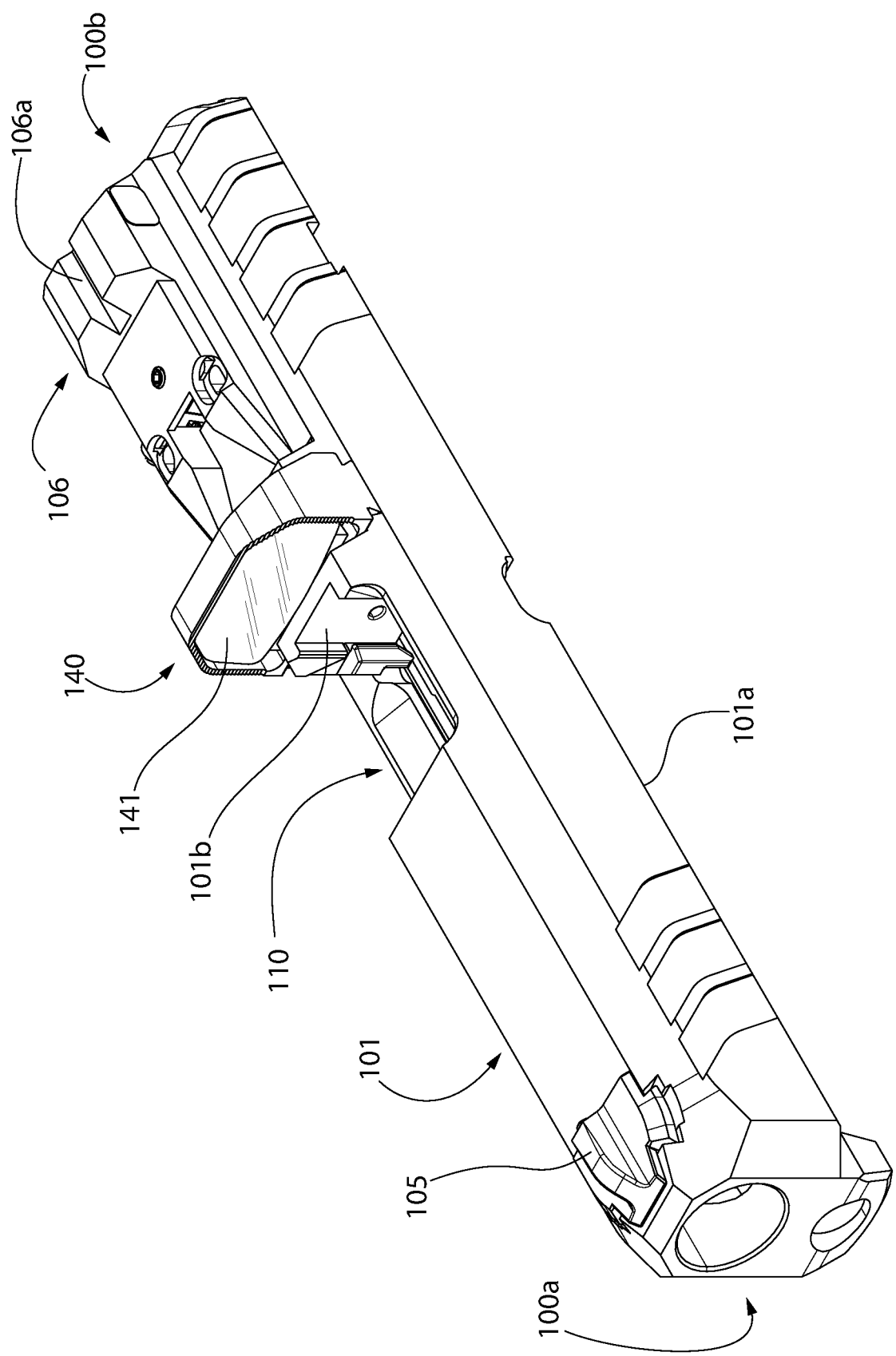
FIG. 2 is a left top perspective view of the slide of the firearm of FIG. 1.
Figure 3:
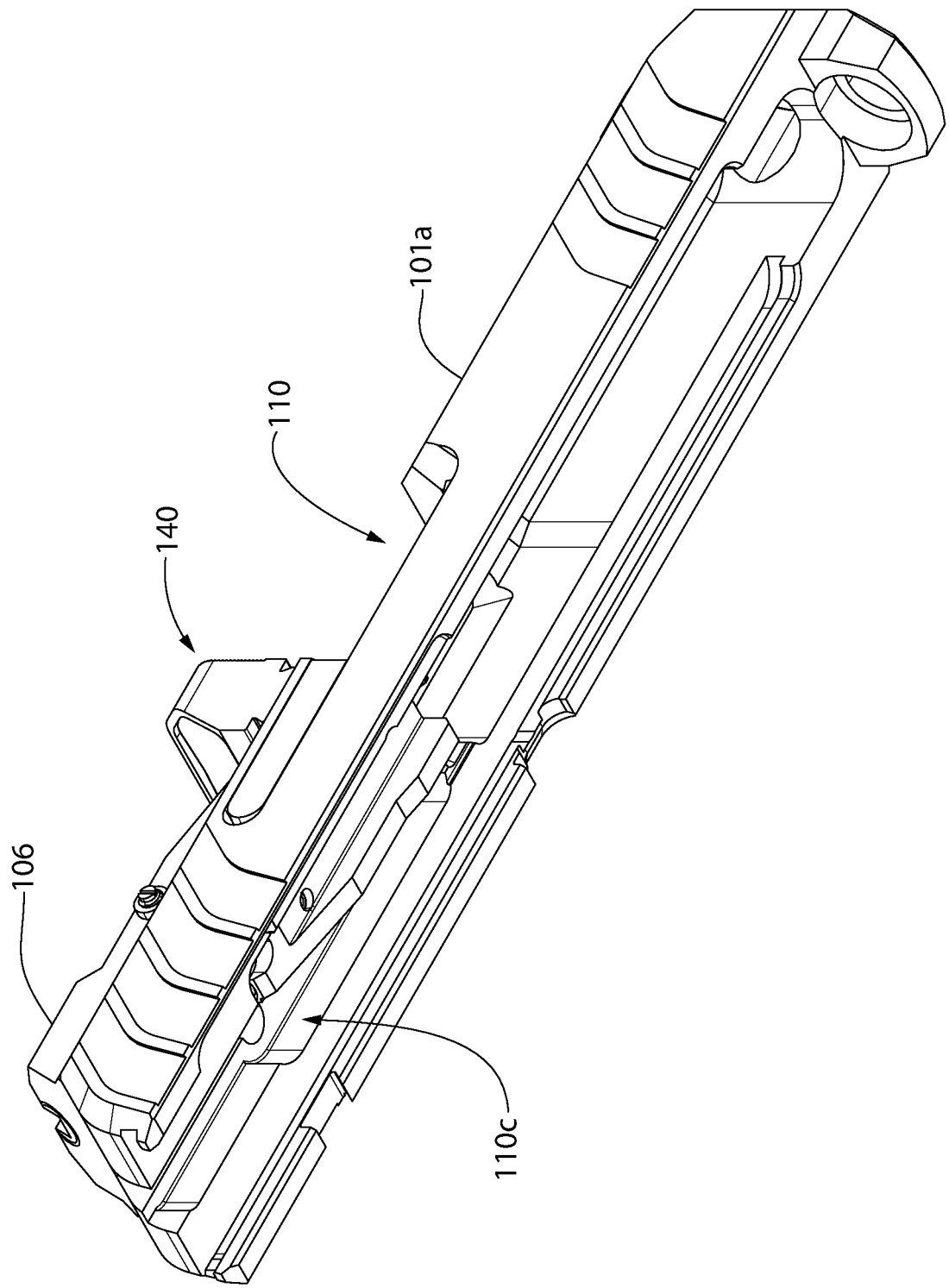
FIG. 3 is a bottom right perspective view thereof.
Figure 24:
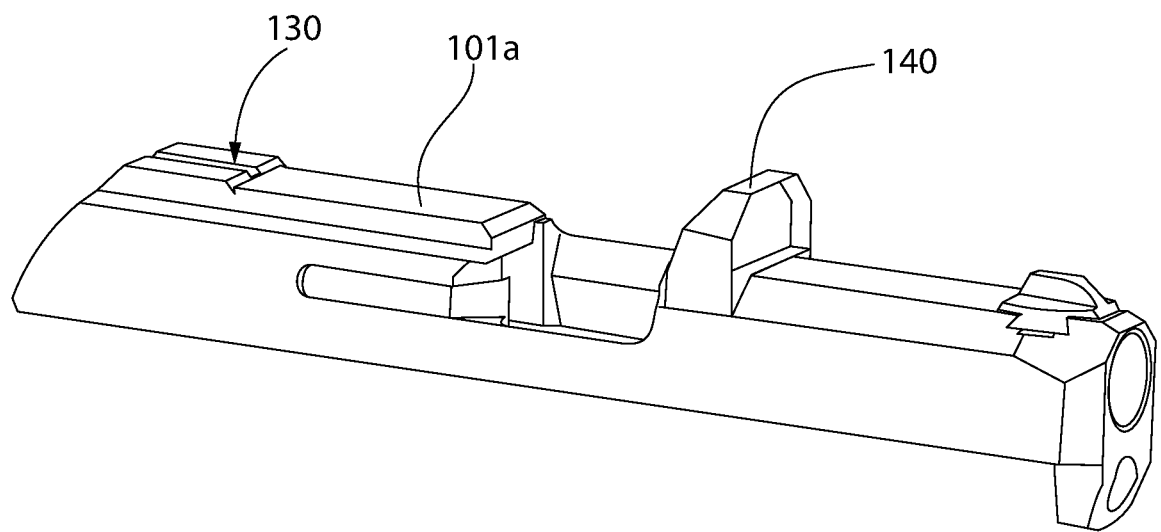
FIG. 24 is an embodiment of the slide showing the lens assembly of FIG. 2 in a position forward of the ejection port of the firearm.
Figure 25:
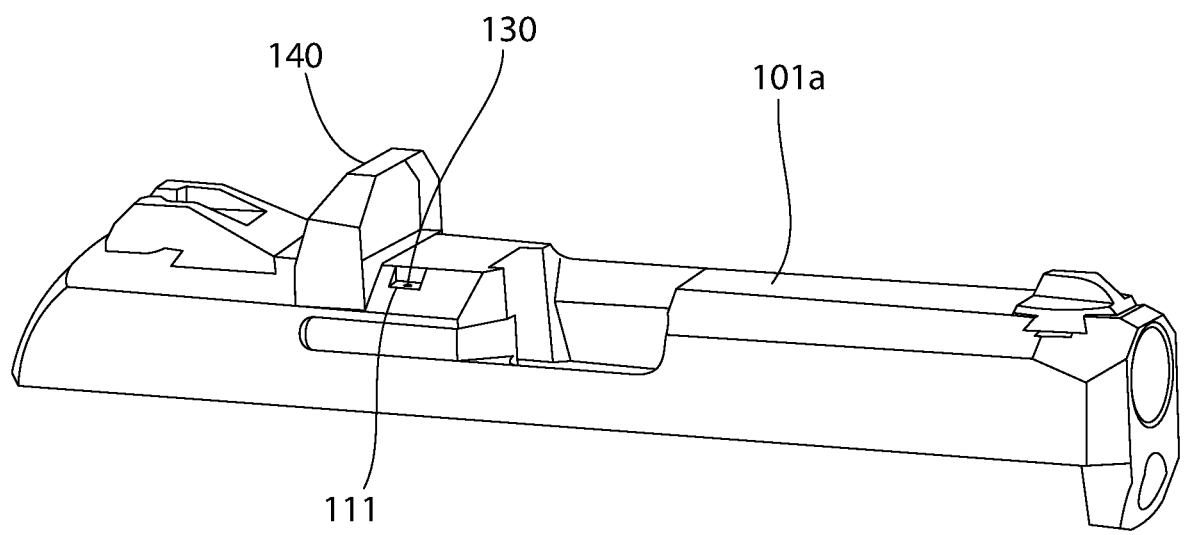
FIG. 25 is an embodiments of the slide showing the illumination source located forward of the lens assembly of FIG. 2.

In various embodiments, the fixed or linearly movable optical lens assembly 140 may be mounted either forward of the ejection port 110 (see, e.g. FIG. 24) or rearward of the ejection port (see, e.g. FIG. 2 or 25). When mounted forward of the ejection port, the illumination source 130 may still be mounted to the rear behind the ejection port as shown in FIG. 24. The illumination source 130 may be mounted offset from the longitudinal centerline of the lens assembly and longitudinal axis LA of the firearm (illumination source shown in the foreground mounted offset to the right side of the firearm in FIG. 24) in upwardly open mounting recess or cavity 111 formed directly in slide 101a. Numerous mounting positions for the illumination source 130 relative to the lens assembly (whether forward or rearward therefrom) may therefore be used such as inline with longitudinal axis of the firearm, offset to the right or left of the longitudinal axis, and forward or rearward of the lens assembly. This allows the illumination source 130 to be adapted to the contour and shape of the firearm body to which it is mounted. Accordingly, the present optic sighting system can be readily retrofit to an existing firearm platform or form factor with minimal alteration to the original firearm design unlike commercially-available all-in-one optic sight housings previously described herein.

A method or process for assembling a firearm 100 with integrated reflex optical sighting system according to the present disclosure will now be briefly described. It bears noting that at least the illumination source 130 (with or without a lighting module 131) and lens assembly 140

(whether fixed or pop-up style) are separately and independently mounted to and removable from the body of the firearm body 101. This is distinguishable from commercially-available optic sighting units in which the light source and lens are mounted in a common outer housing and thus cannot be independently mounted to or removed from the firearm without removing the entire housing of the optics unit.

In one embodiment, the method comprises first providing the firearm 100 with body 101. A first mounting location L1 on the firearm body is specially configured via a forming step comprising machining/fabrication to form first mounting interface configuration C1 previously described herein for coupling to and mounting the illumination source 130/lighting module 131 to body 101 of firearm 100. A second mounting location L2 on the firearm body is specially configured via a forming step comprising machining/fabrication to form second mounting interface configuration C2 previously described herein for coupling to and mounting the lens assembly 140 to body 101 of firearm 100. The first and second interface configurations being different. The first and second mounting locations L1 and L2 are spatially separated and discrete. The forming steps may be performed in any order. In one non-limiting embodiment, the mounting locations and interface configurations may be on a reciprocating slide 101*a* of a semi-automatic pistol.

Following completion of the firearm provision and forming steps, mounting of the illuminated reflex optical sighting system may begin. Illumination source 130 or lighting module 131 comprising the illumination source 130 may be directly coupled and mounting to firearm body 101 at the first mounting location L1. Similarly, in a separate step, optical lens assembly 140 may be directly coupled and mounted to the firearm body at the discrete second mounting location L2. These two mounting steps may be performed in any order.

A next step may comprise electrically connecting or coupling power source 120 to the illumination source 130 which is operable to project a reticle onto lens 141 of the lens assembly 140 operable for aiming the firearm. The illumination source and lens assembly are independently supported by the body of the firearm at the first and second discrete mounting locations, respectively.

In embodiments previously described herein wherein the lighting module 131/illumination source 130 and associated power source 120 and lighting control circuit 150 PCB are mounted inside cavity 111 formed in the metal rear sight 106 as previously described herein, the rear sight may simply be mounted to top surface 111*a* of slide 101*a* after completion of the above firearm provision and forming steps.

Figure 20:
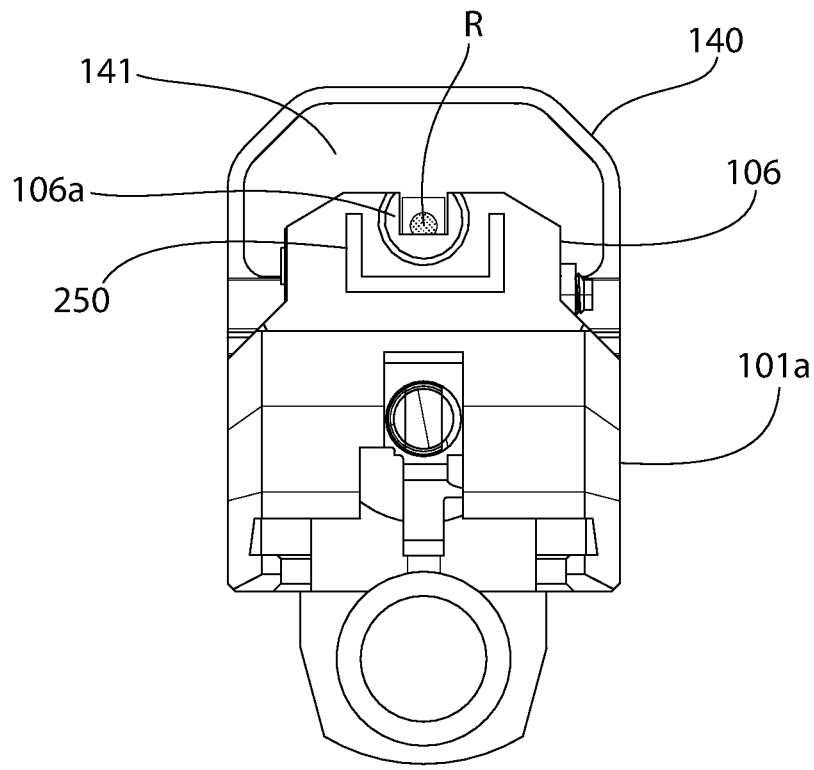
FIG. 20 is a rear view of the slide showing a light tube integrated into the metal rear sight of the firearm.
Figure 21:
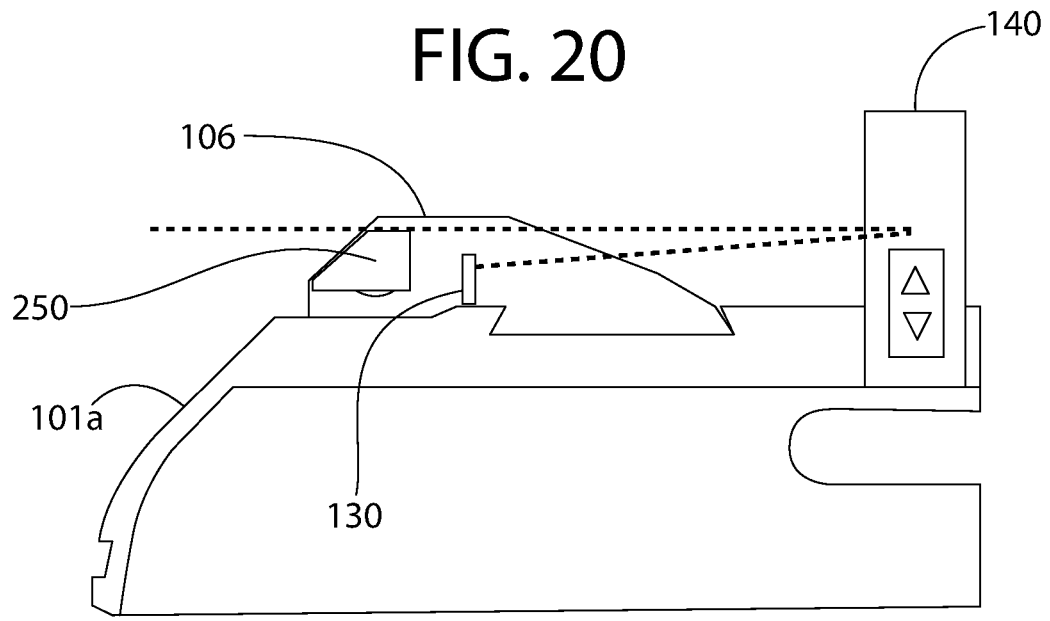
FIG. 21 is a partial rear side cross sectional view thereof.

According to another aspect of the reflex optical sighting system, the illumination source 130 in some embodiments may also simultaneously illuminate a plastic or fiber light pipe or tube 250 which may be integrated into the metallic rear sight 106. Such an arrangement is shown in FIGS. 20-21. Illumination source 130 is located proximate to light tube 250 which absorbs the light emitted by the source. Any suitable type or shape of light tube may be used (e.g. U-shaped or other). The illustrated embodiment depicts a U-shaped light tube.

Vertically Movable Optical Lens Assembly

Figure 22:
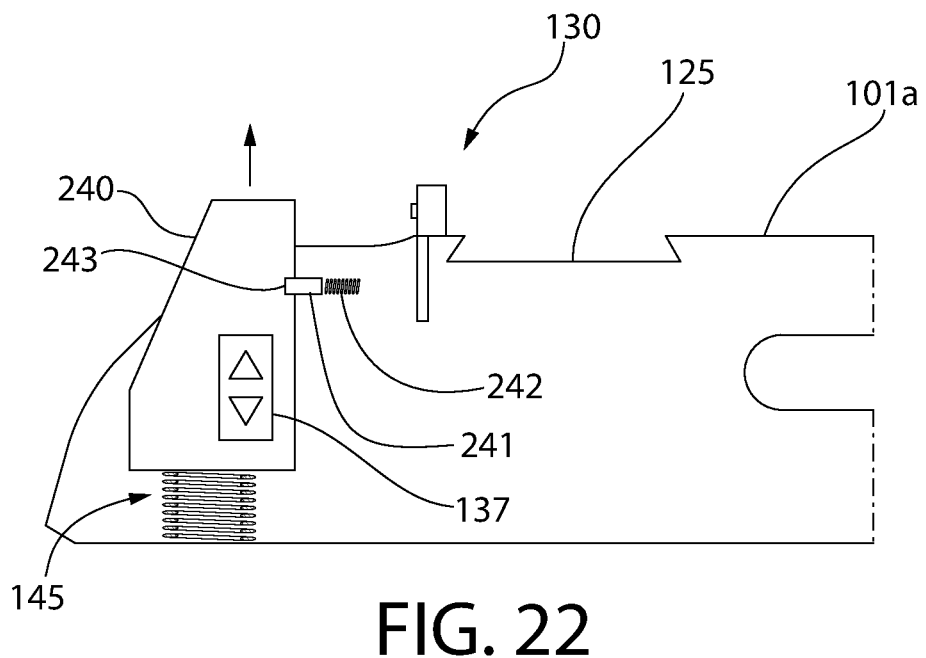
FIG. 22 is a partial side view of the slide showing a pop-up lens assembly in a downward retracted position.
Figure 23:
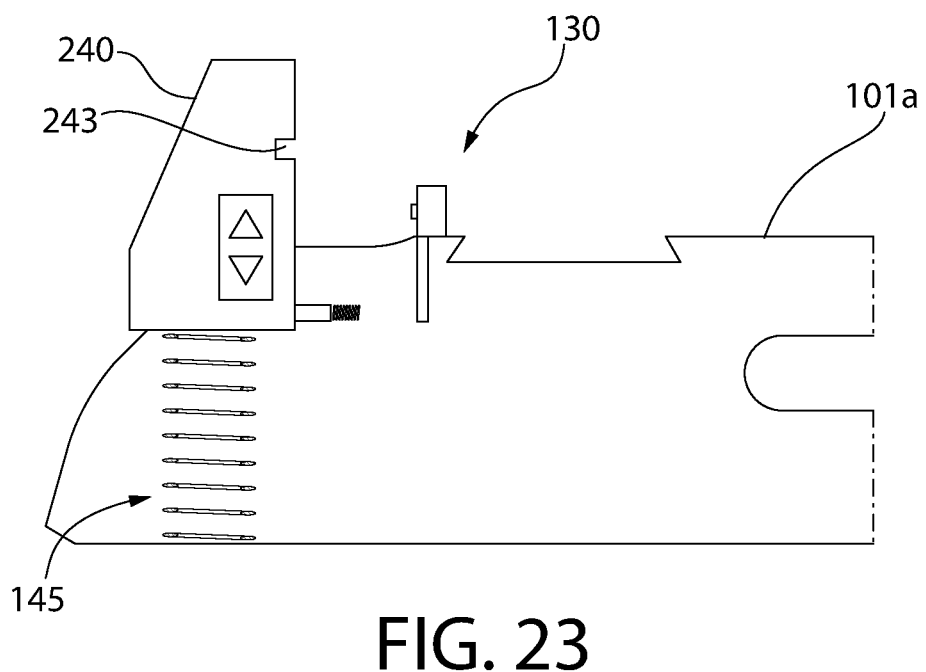
FIG. 23 is a partial side view thereof showing the pop-up lens assembly in an upward extended position.

Alternatively locating the illumination source 130 in front of the optical lens assembly 140 in one embodiment referenced above creates a unique design opportunity for the integrated optical sighting system design. Accordingly, a vertically movable "pop-up" type lens assembly 240 may be used. FIG. 22 shows the lens assembly in a retracted position for storage/transport of the firearm, and FIG. 23 shows the lens assembly in the extended position ready for use. Illumination source 130 is mounted on slide 101*a* forward of movable lens assembly 240.

The movable lens assembly 240 may be placed at the rear of the firearm body in one non-limiting embodiment (e.g. slide 101*a* of a pistol in one example as shown). The movable lens assembly is linearly moveable and slideable in the vertical direction between the retracted position (FIG. 22) at least partially recessed into the firearm, and extended position (FIG. 23) when the sighting system is in use. In the retracted position, the lens assembly may be at least partially recessed into the body 101 of the firearm 100, or fully recessed. If partially recessed such that a portion of the peripheral frame 142 protrudes above the top surface of the firearm body in the retracted position of the lens assembly, preferably at least the lens 141 of the lens assembly is fully concealed and recessed into the body for protection against damage when not in use. The lens assembly may be spring-biased in one embodiment toward the extended position by one or more springs 145 of any suitable type and configuration (depicted schematically in the figures). A user-accessible movable lens assembly catch 146 may be provided which is operably interfaced between the firearm body (e.g., slide 101*a*) and lens assembly 240. Catch 146 in one embodiment may comprise a spring-biased detent mechanism including a detent plug 241 biased into engagement with complementary configured detent recess 243 by spring 242. The slideable catch is configured to lock and retain the lens assembly in the retracted position, and release the lens assembly to move (i.e. pop-up vertically) to the extended position when the catch is actuated. When not in use, the user could press the lens assembly back down into the slide to protect the optical lens from debris and scratching. As opposed to some conventional pivot-action or folding sights in which the lens remains exposed when not in use but folded down, the lens 141 in the present vertically moveable pop-up lens assembly design is advantageously substantially shielded by the firearm body and protected from damage (e.g. breakage/scratching) and debris.

While the foregoing description and drawings represent preferred or exemplary embodiments of the present invention, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes as applicable described herein may be made without departing from the spirit of the invention. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. An illuminated reflex optical sighting system integrated directly with a firearm comprising:
   a lighting module comprising an illumination source mounted to a body of the firearm at a discrete first mounting location;
   an optical lens assembly mounted to the body of the firearm at a discrete second location spatially distanced from the first location; and
   a power source operably coupled to the illumination source;
   the illumination source configured and operable to project a reticle through air onto a lens of the lens assembly for use in aiming the firearm;
   wherein the illumination source and lens assembly are separately mounted to and independently removable from the body of the firearm;
   wherein the firearm is selected from the group consisting of a pistol, a revolver, a rifle, and a shotgun.

2. The sighting system according to claim 1, wherein the first mounting location has a first interface configuration which is configured to mount the lighting module, and the second mounting location has a second interface configuration which is configured to mount the lens assembly, the first interface configuration being different than the second interface configuration.

3. An illuminated reflex optical sighting system integrated directly with a firearm comprising:
   a lighting module comprising an illumination source mounted to a body of the firearm at a discrete first mounting location;
   an optical lens assembly mounted to the body of the firearm at a discrete second location spatially distanced from the first location; and
   a power source operably coupled to the illumination source;
   the illumination source configured and operable to project a reticle through air onto a lens of the lens assembly for use in aiming the firearm;
   wherein the illumination source and lens assembly are separately mounted to and independently removable from the body of the firearm;
   wherein the first mounting location has a first interface configuration which is configured to mount the lighting module, and the second mounting location has a second interface configuration which is configured to mount the lens assembly, the first interface configuration being different than the second interface configuration;
   wherein the lighting module is integrated into a rear sight of the firearm having an aiming notch.

4. The sighting system according to claim 3, wherein the lighting module is nested in a lighting cavity formed in the rear sight.

5. The sighting system according to claim 4, further comprising an electronic lighting control circuit disposed in the cavity of the rear sight and operably coupled to the illumination source and power source, the lighting control circuit being configured to allow user adjustment of a brightness level of the illumination source and reticle projected on the lens.

6. The sighting system according to claim 5, wherein the power source is disposed in the cavity of the rear sight.

7. The sighting system according to claim 4, wherein the illumination source is movably adjustable in position by adjusting adjustment screws engaged with the lighting module and accessible through openings in the rear sight such that a position of the reticle on the lens assembly is changeable by adjusting the screws of the rear sight.

8. The sighting system according to claim 7, wherein the adjustment screws include a vertical adjustment screw operable to move the lighting module in a vertical direction, and a lateral adjustment screw operable to move the lighting module in a lateral direction.

9. The sighting system according to claim 3, wherein the rear sight is mounted to a reciprocating slide of the firearm.

10. The sighting system according to claim 2, wherein the illumination source is mounted forward of the lens assembly.

11. The sighting system according to claim 2, wherein the illumination source is mounted rearwards of the lens assembly.

12. The sighting system according to claim 2, wherein the lens assembly comprises a peripheral frame supported directly by the body of the firearm without any intervening structures, and a lens supported by the peripheral frame.

13. An illuminated reflex optical sighting system integrated directly with a firearm comprising:
   a lighting module comprising an illumination source mounted to a body of the firearm at a discrete first mounting location;
   an optical lens assembly mounted to the body of the firearm at a discrete second location spatially distanced from the first location; and
   a power source operably coupled to the illumination source;
   the illumination source configured and operable to project a reticle onto a lens of the lens assembly for use in aiming the firearm;
   wherein the illumination source and lens assembly are separately mounted to and independently removable from the body of the firearm;
   wherein the lens assembly is movably mounted to the body of the firearm, the lens assembly linearly movable in a vertical direction between a retracted position and an extended position relative to the body of the firearm.

14. The sighting system according to claim 13, wherein the lens of the lens assembly is recessed into the body of the firearm for protection when the lens assembly is in the retracted position.

15. The sighting system according to claim 1, wherein the illumination source is an LED.

16. The sighting system according to claim 2, wherein the illumination source, lens assembly, and power source are not disposed in a common outer housing separable from the body of the firearm as a single unit.

17. The sighting system according to claim 9, wherein the power source is a battery which is only accessible from an underside of the slide when removed from the firearm.

18. The sighting system according to claim 1, wherein the reticle is dot-shaped.

19. A firearm with integrated illuminated reflex optical sight comprising:
   an elongated body comprising a first mounting location having a first interface configuration and a discrete second mounting location spatially separated from the first mounting location and having a second interface configuration different than the first interface configuration;
   a lighting module comprising an illumination source, the lighting module being mounted to the body of the firearm at the first mounting location, the lighting module being complementary configured to the first interface configuration;

an optical lens assembly mounted to the body of the firearm at the second mounting location, the lens assembly being complementary configured to the second interface configuration which is different than the first interface configuration; and a power source operably coupled to the illumination source;

the illumination source operable to project a reticle through air onto a lens of the lens assembly for use in aiming the firearm;

wherein the illumination source and lens assembly are not disposed in a common outer housing removable from the body of the firearm as a single unit.

20. The firearm according to claim 19, wherein the lighting module and power source are disposed in a cavity formed in a rear sight affixed to the firearm and having an aiming notch.

21. A method for assembling a firearm with integrated reflex optical sighting system comprising:

providing the firearm including a body;

forming a first interface configuration at the first discrete mounting location and forming a second interface configuration at the second discrete mounting location, the first and second interface configurations being different than each other;

mounting an illumination source onto the body at a first discrete mounting location;

in a separate step, mounting an optical lens assembly onto the body at a second discrete location spatially distanced from the first discrete location; and coupling a power source to the illumination source, the illumination source operable to project a reticle through air onto a lens of the lens assembly operable for aiming the firearm;

wherein the lens assembly and illumination source are independently supported by the body of the firearm at the first and second discrete locations, respectively; and wherein the illumination source and power source are disposed in a cavity formed in a metal rear sight mounted rearward of the lens assembly on the firearm.

22. The sighting system according to claim 1, wherein the lighting module is not removable without disassembling at least one component of the firearm.

23. The firearm according to claim 19, wherein the body to which both the lighting module and optical lens assembly are mounted is a reciprocating slide movable in forward and rearward directions on a frame of the firearm.

24. The firearm according to claim 23, wherein the power source is a battery which is only accessible from an underside of the reciprocating slide when the slide is removed from the body of the pistol.

* * * * *